United States Patent
Bae et al.

(10) Patent No.: US 10,919,528 B2
(45) Date of Patent: Feb. 16, 2021

(54) VEHICLE DRIVING ASSISTANCE DEVICE AND VEHICLE

(71) Applicant: LG Electronics Inc., Seoul (KR)

(72) Inventors: Hyeonju Bae, Seoul (KR); Geunsoo Son, Seoul (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 16/302,418

(22) PCT Filed: Nov. 26, 2016

(86) PCT No.: PCT/KR2016/013737
§ 371 (c)(1),
(2) Date: Nov. 16, 2018

(87) PCT Pub. No.: WO2017/200162
PCT Pub. Date: Nov. 23, 2017

(65) Prior Publication Data
US 2019/0276022 A1    Sep. 12, 2019

(30) Foreign Application Priority Data

May 18, 2016 (KR) .......................... 10-2016-0060974

(51) Int. Cl.
*B60W 30/18* (2012.01)
*B60W 10/04* (2006.01)
(Continued)

(52) U.S. Cl.
CPC ............ *B60W 30/18* (2013.01); *B60W 10/04* (2013.01); *B60W 10/18* (2013.01); *B60W 10/20* (2013.01); *B60W 40/02* (2013.01); *B60W 40/10* (2013.01); *B60W 50/14* (2013.01); *B60W 2050/009* (2013.01); *B60W 2050/146* (2013.01);
(Continued)

(58) Field of Classification Search
CPC ...... B60W 30/18; B60W 40/10; B60W 40/02; B60W 10/04; B60W 10/18; B60W 10/20; B60W 50/14; B60W 2555/60; B60W 2050/009; B60W 2050/146; B60W 2420/42; B60W 2710/18; B60W 2710/20; B60W 2720/106; B60W 2520/10; B60W 2050/143; B60W 2540/215; B60W 2540/20; B60W 2540/18; B60W 2556/50; B60W 2552/00; B60W 2050/0091; B60W 10/184

See application file for complete search history.

(56) References Cited

U.S. PATENT DOCUMENTS

| 6,560,529 | B1 * | 5/2003 | Janssen | G06K 9/72 |
| | | | | 701/469 |
| 2008/0137908 | A1 * | 6/2008 | Stein | G08G 1/096783 |
| | | | | 382/103 |

(Continued)

*Primary Examiner* — Rodney A Butler
(74) *Attorney, Agent, or Firm* — Fish & Richardson P.C.

(57) ABSTRACT

Disclosed is a driver assistance apparatus for a vehicle, the apparatus including: a camera configured to acquire a front field-of-view image of the vehicle; an output unit; and a processor configured to detect at least one traffic sign based on the front field-of-view image of the vehicle, determine whether the traffic sign fits travel information of the vehicle, and, when the traffic sign fits the vehicle travel information, perform control to output the traffic sign through the output unit.

19 Claims, 29 Drawing Sheets

(51) Int. Cl.
*B60W 50/14* (2020.01)
*B60W 40/10* (2012.01)
*B60W 10/18* (2012.01)
*B60W 10/20* (2006.01)
*B60W 40/02* (2006.01)
*B60W 50/00* (2006.01)

(52) U.S. Cl.
CPC ..... *B60W 2420/42* (2013.01); *B60W 2555/60* (2020.02); *B60W 2710/18* (2013.01); *B60W 2710/20* (2013.01); *B60W 2720/106* (2013.01)

(56) References Cited

U.S. PATENT DOCUMENTS

| | | | | |
|---|---|---|---|---|
| 2013/0049988 A1* | 2/2013 | Roeber | ............... | G08G 1/09623 |
| | | | | 340/905 |
| 2015/0332104 A1* | 11/2015 | Kapach | ................ | G06K 9/6202 |
| | | | | 382/104 |
| 2015/0345974 A1* | 12/2015 | Takahashi | ............. | B60W 50/14 |
| | | | | 701/461 |
| 2017/0323452 A1* | 11/2017 | Chen | ....................... | G06F 17/18 |

\* cited by examiner

[FIG. 1]
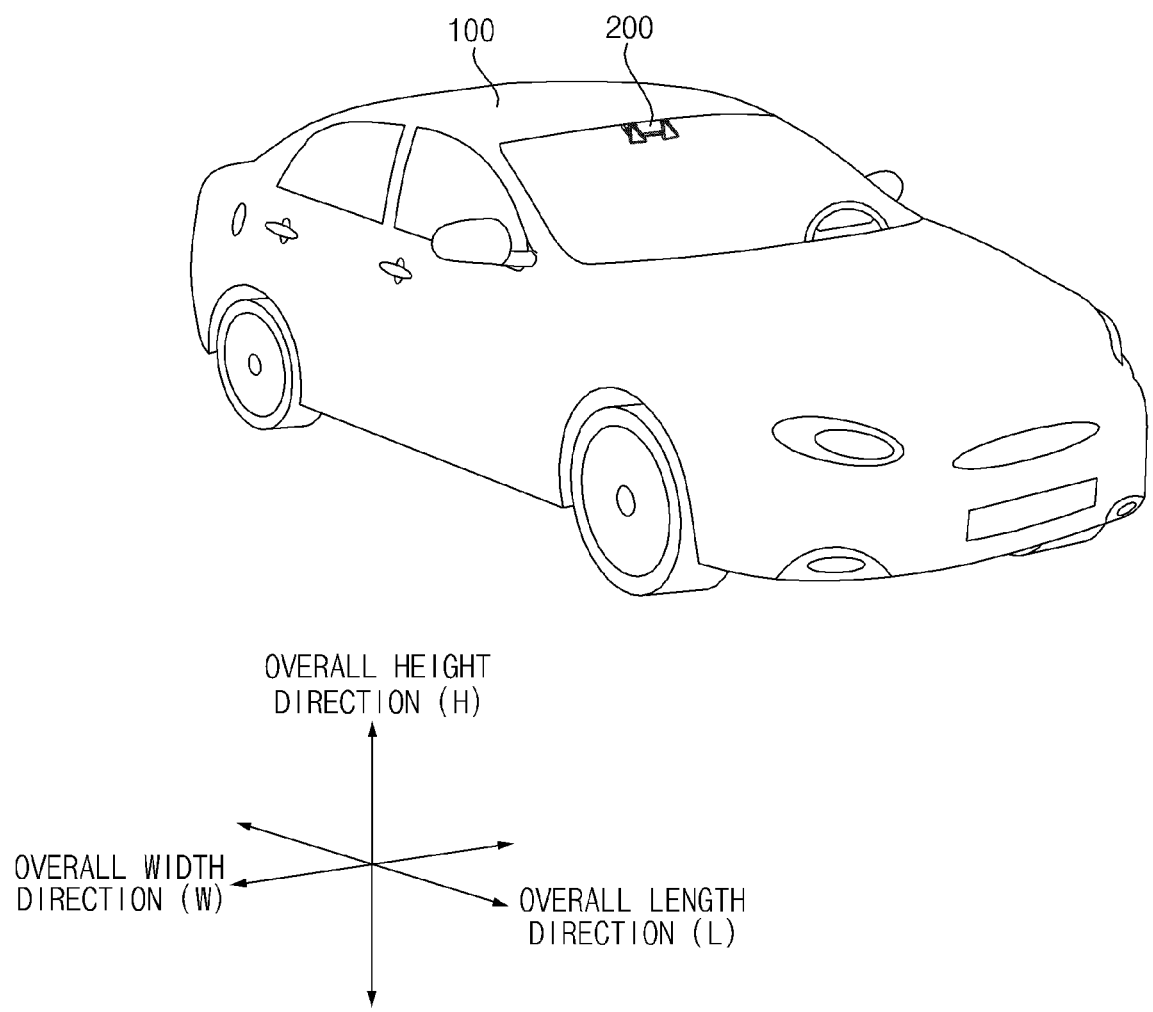

[FIG. 2]
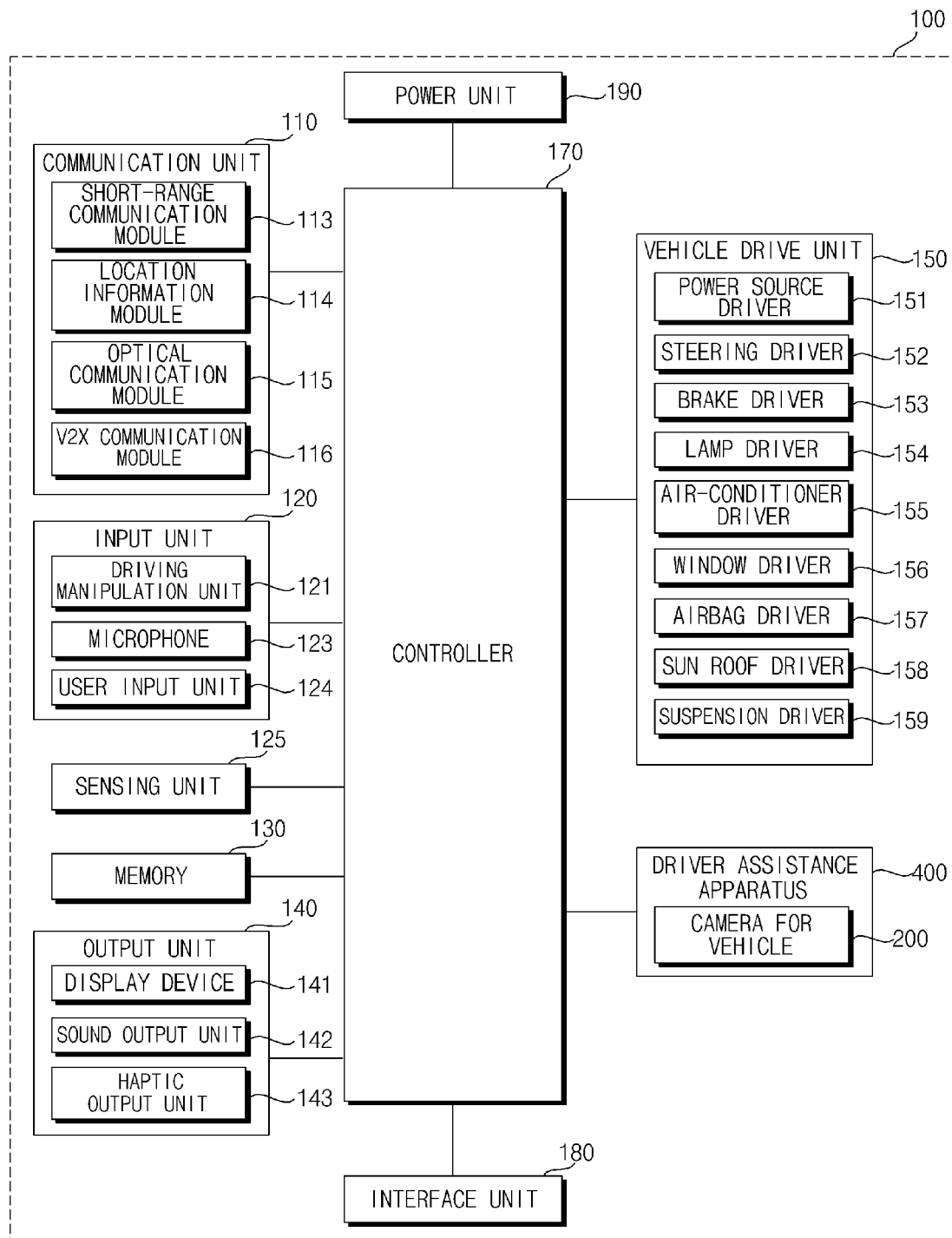

[FIG. 3A]
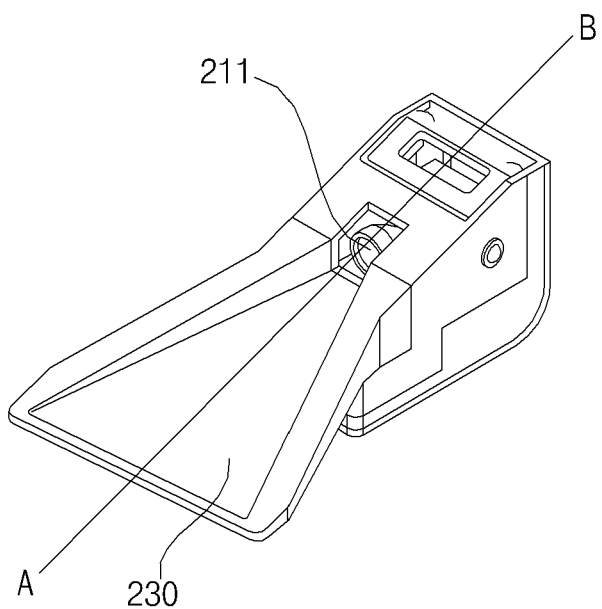

[FIG. 3B]
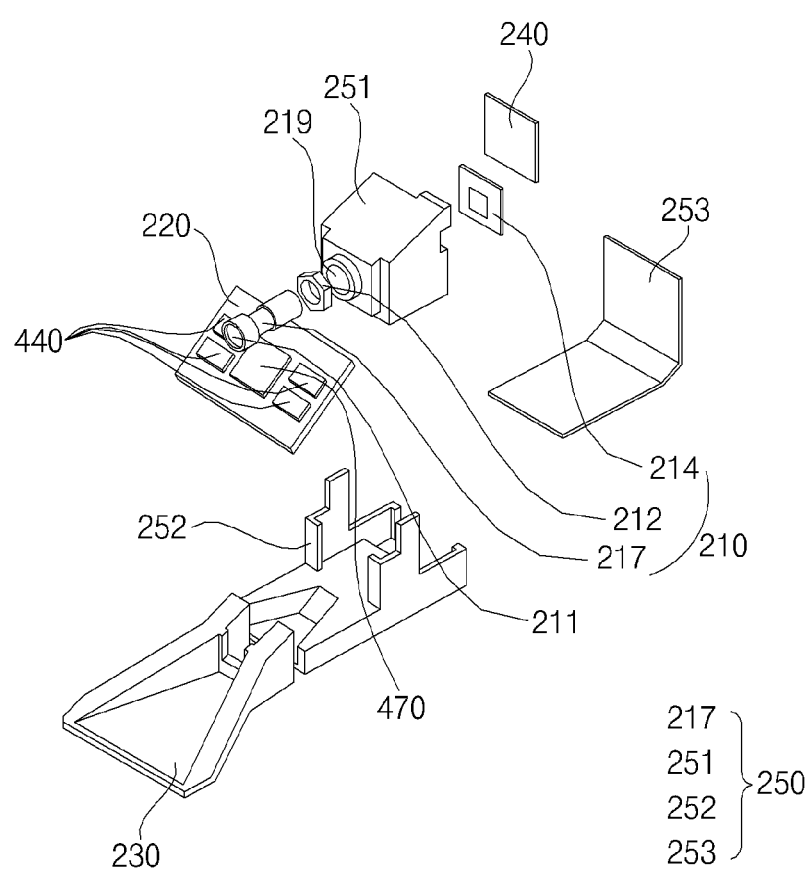

[FIG. 3C]
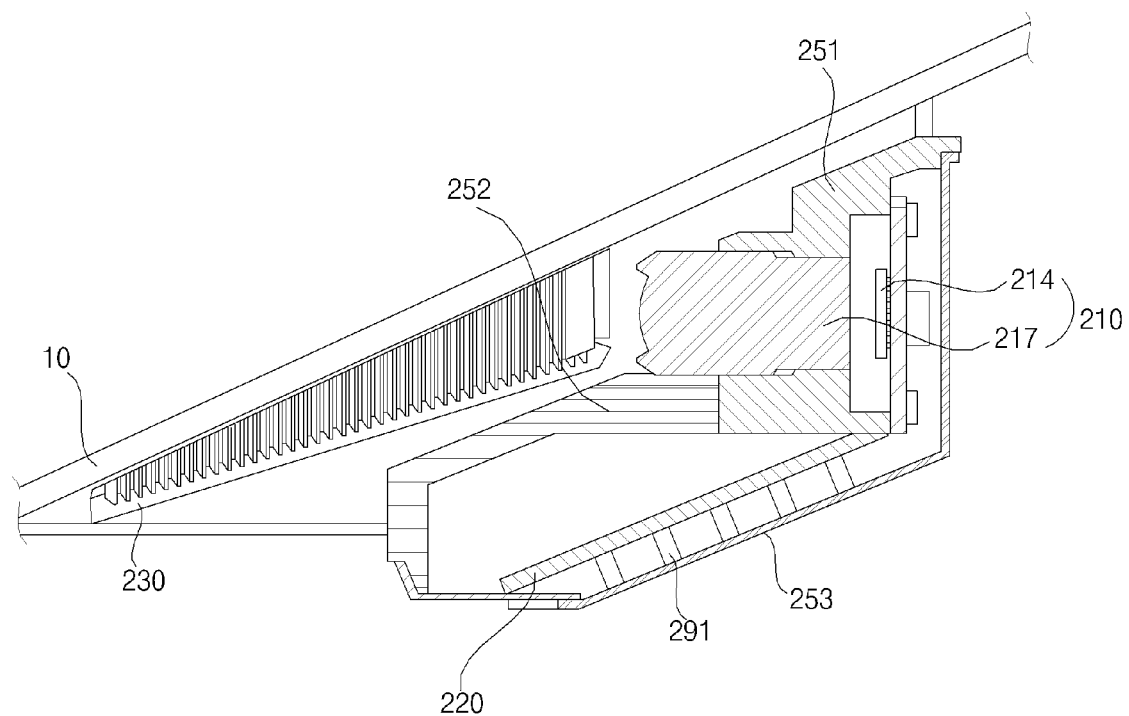

【FIG. 3D】
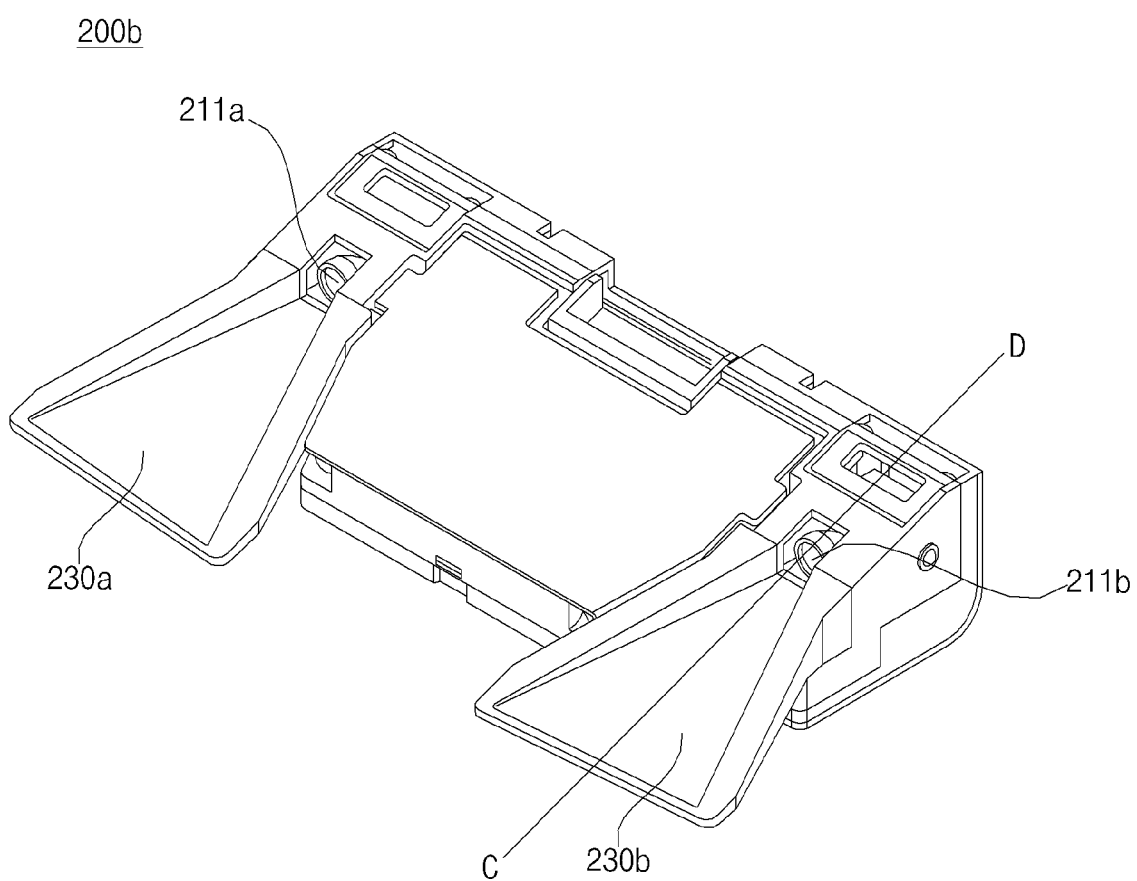

【FIG. 3E】
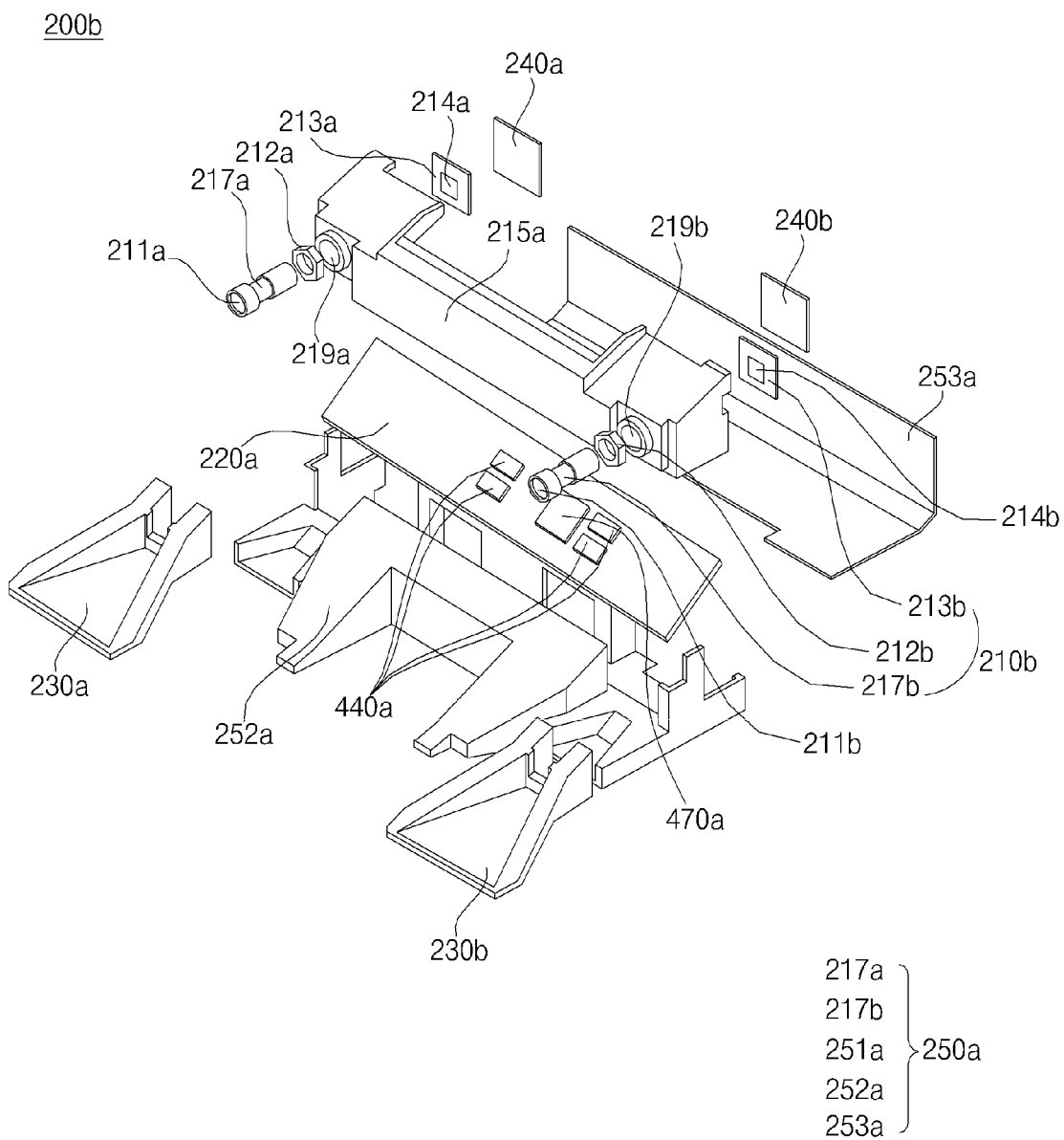

[FIG. 3F]
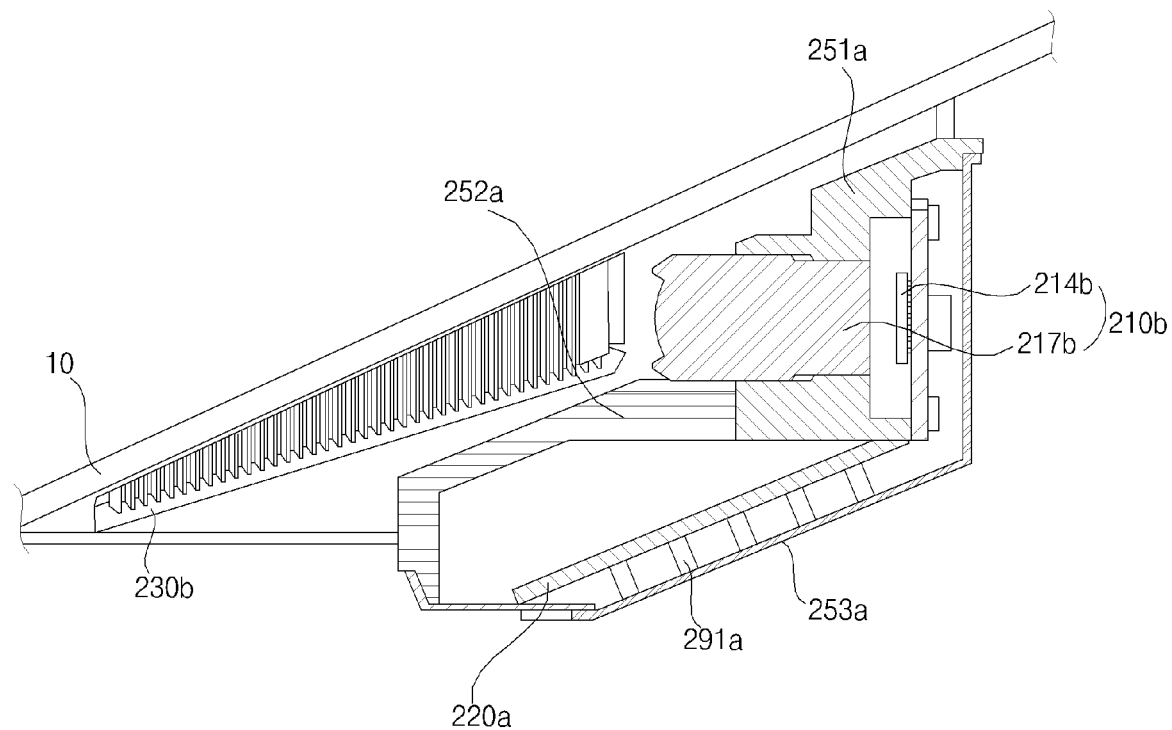

[FIG. 4A]
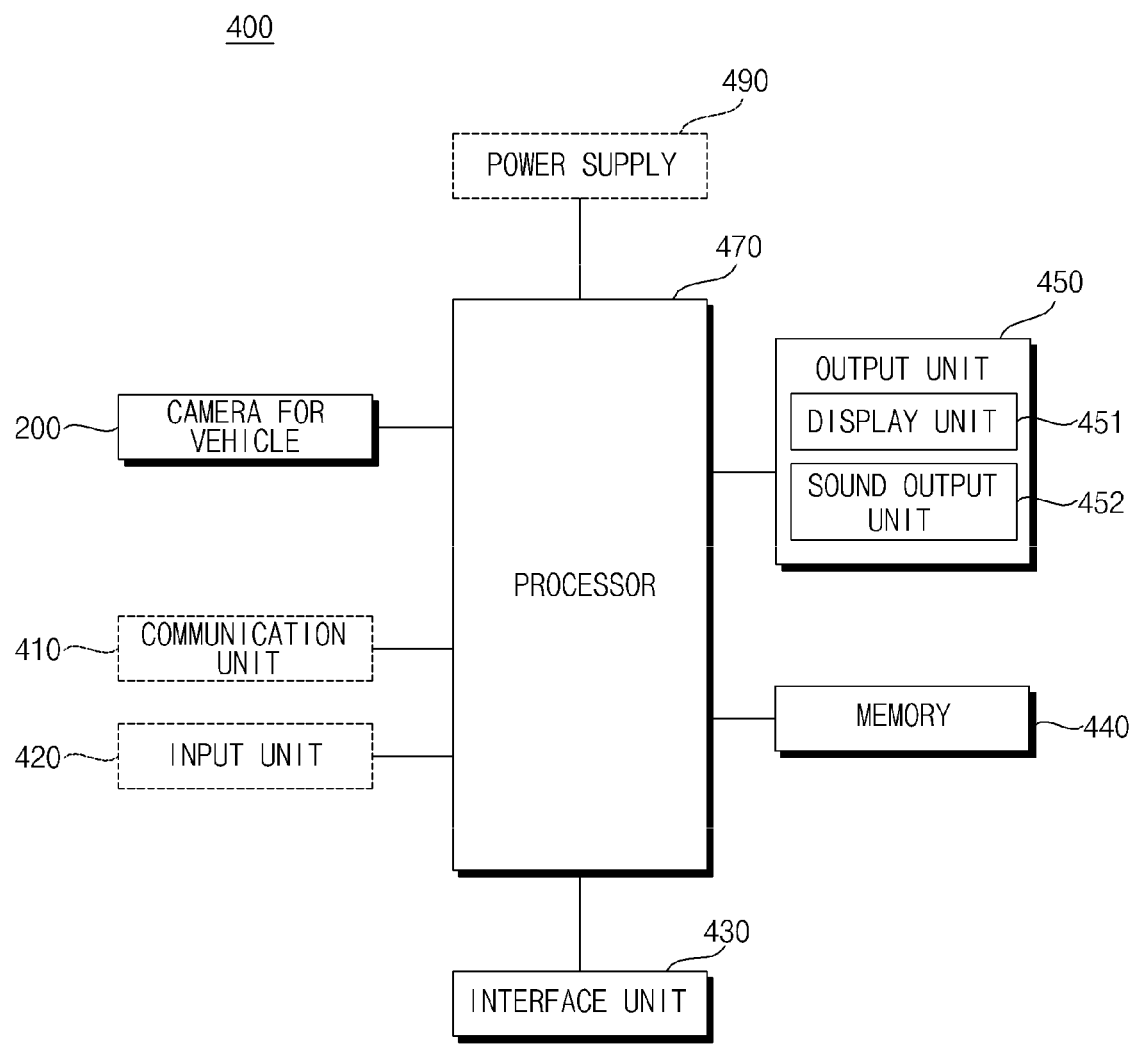

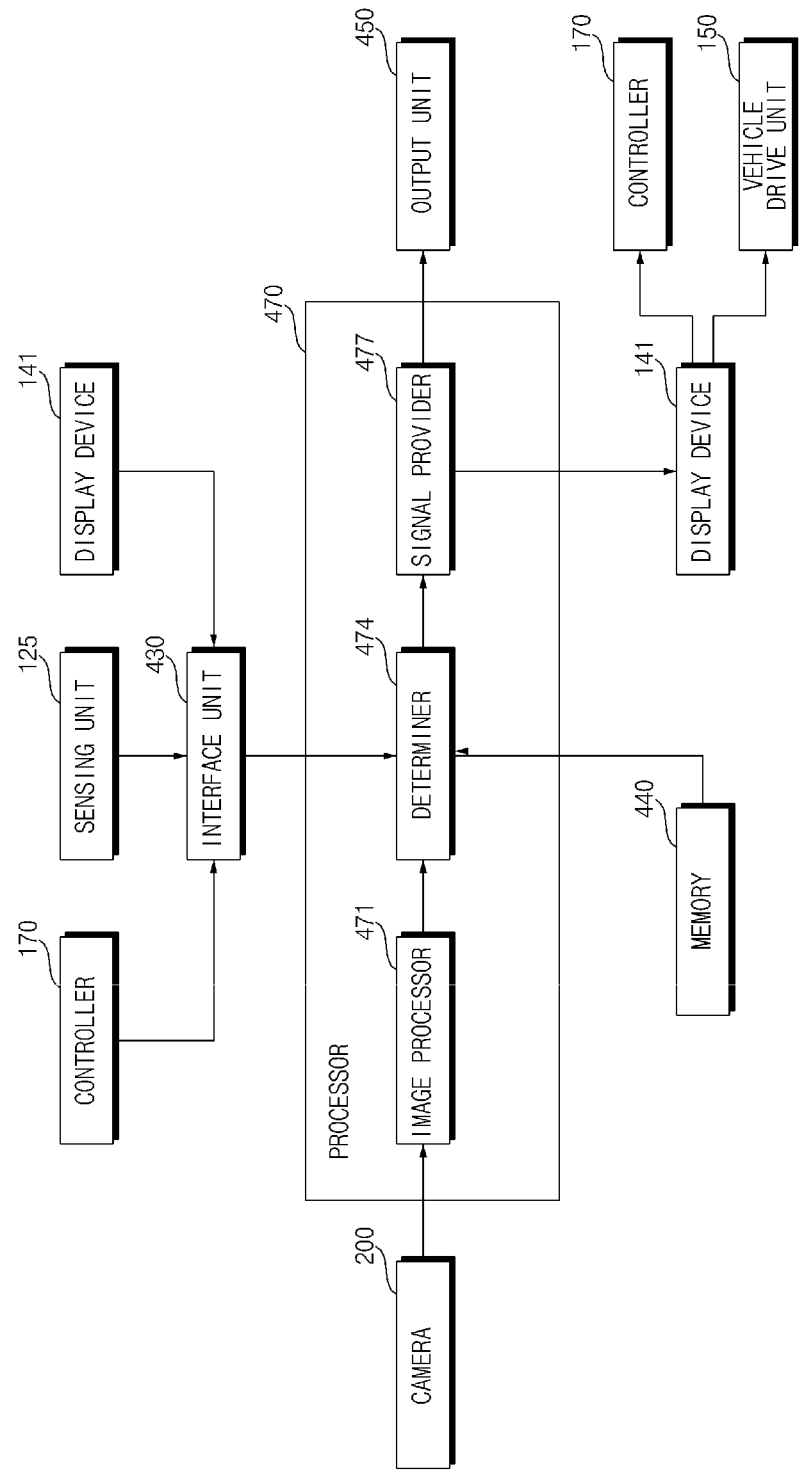
[FIG. 4B]

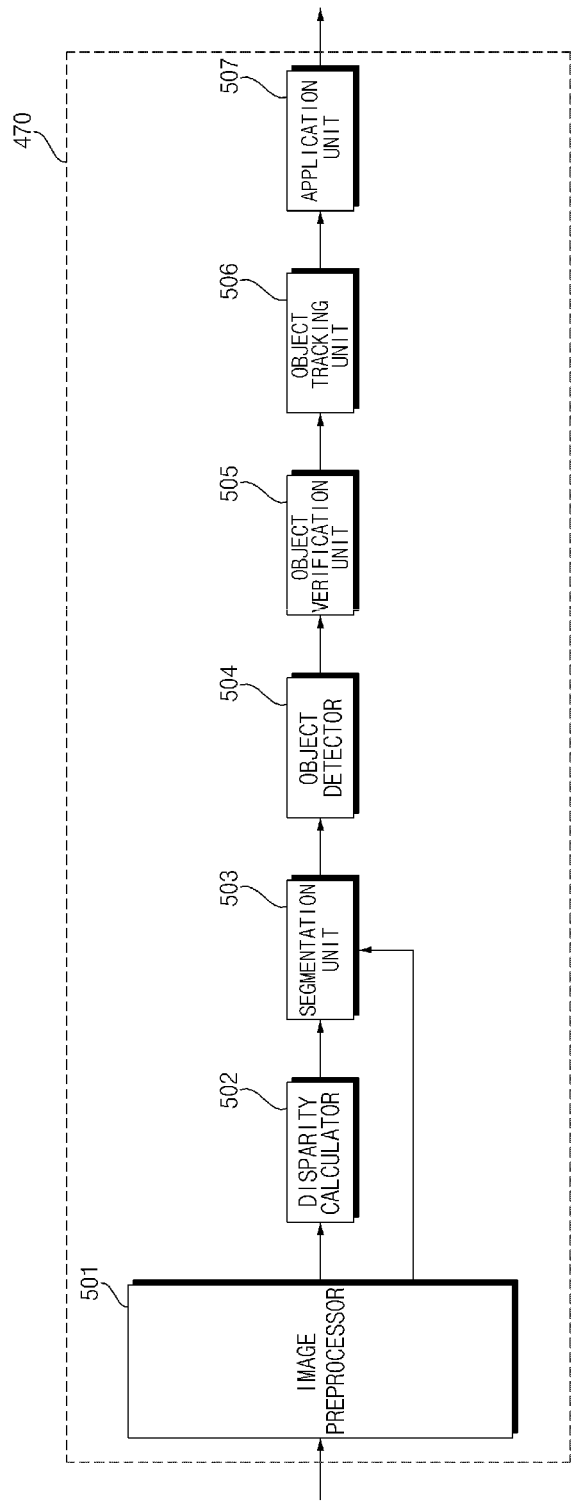
[FIG. 5A]

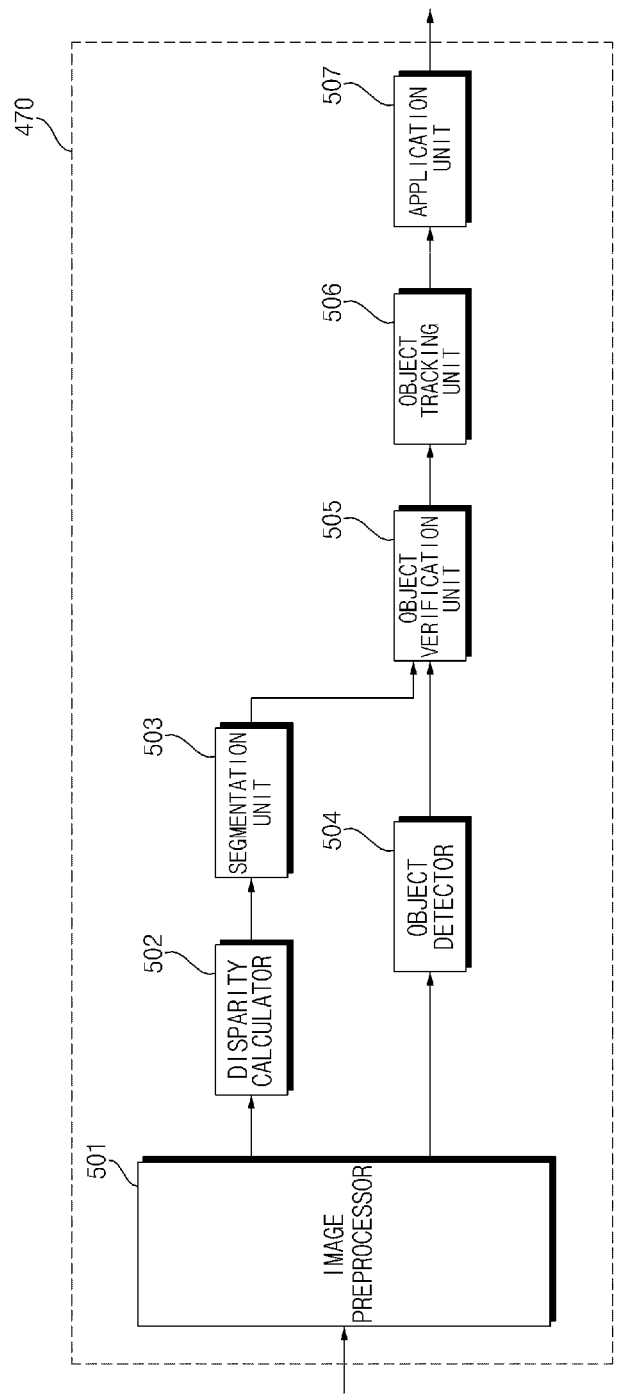
[FIG. 5B]

【FIG. 5C】
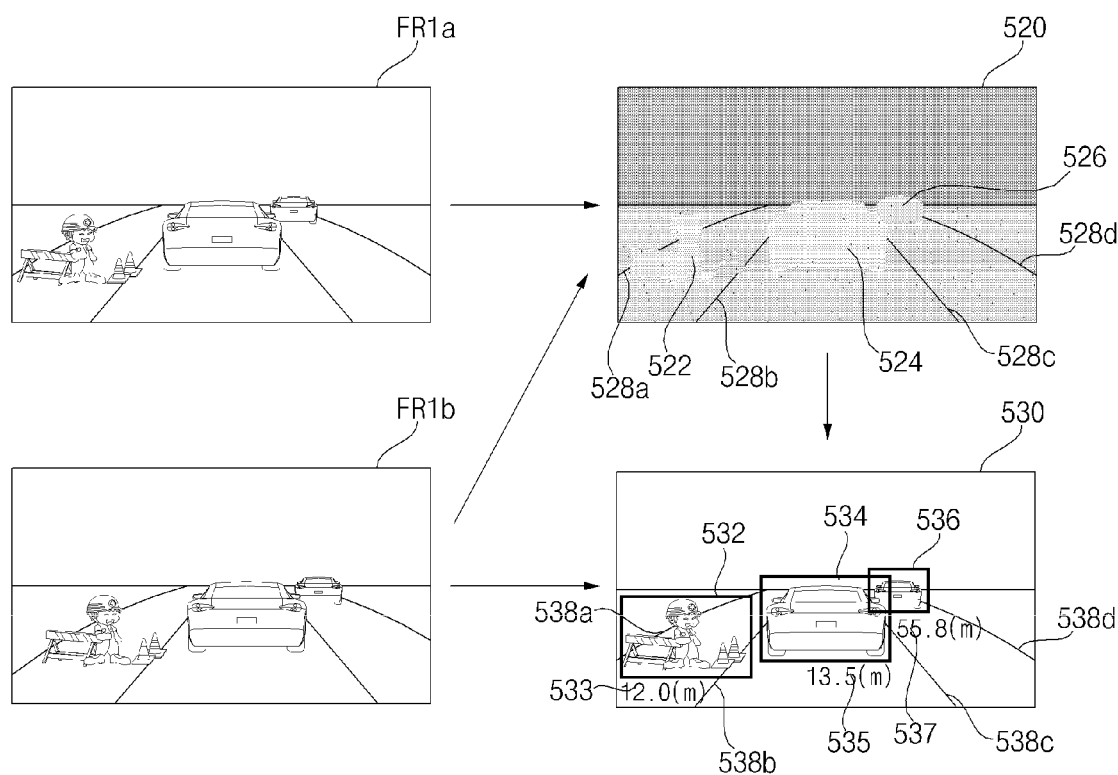

[FIG. 5D]
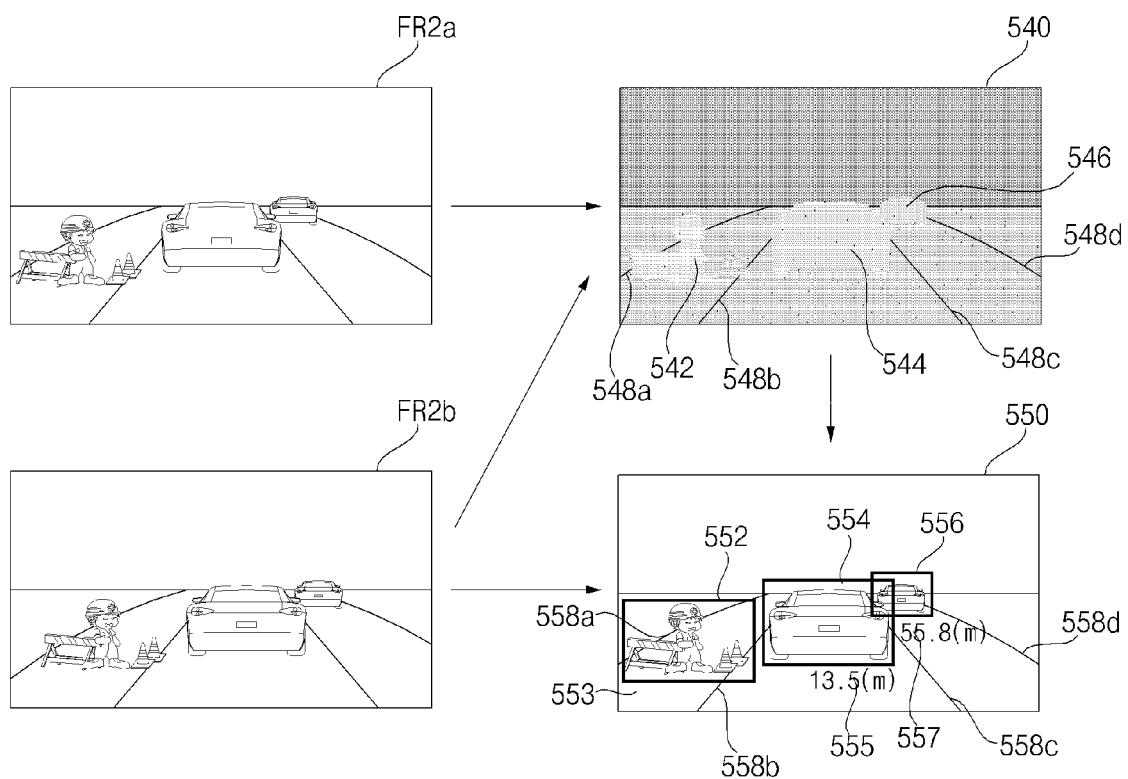

[FIG. 5E]
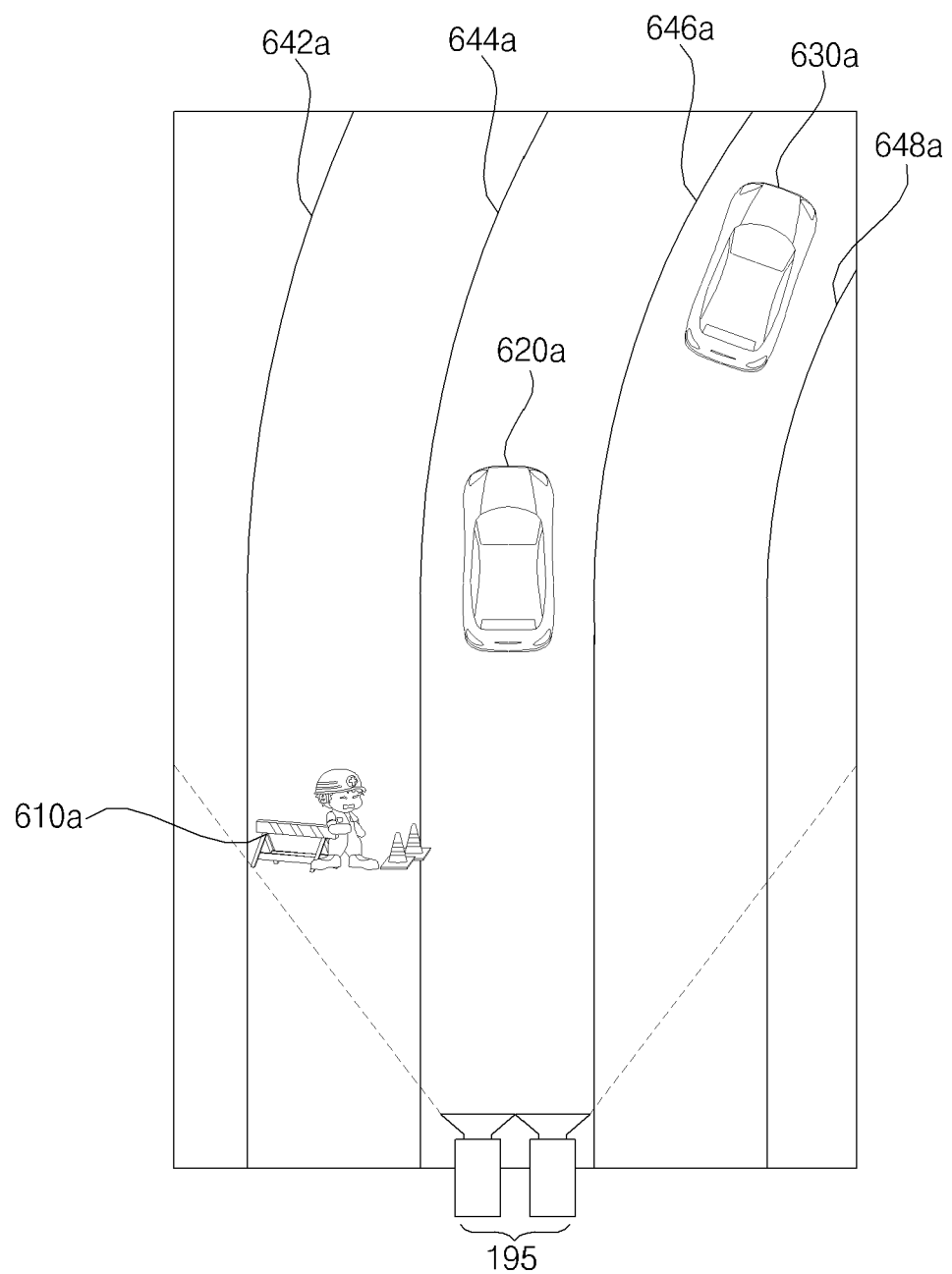

[FIG. 5F]
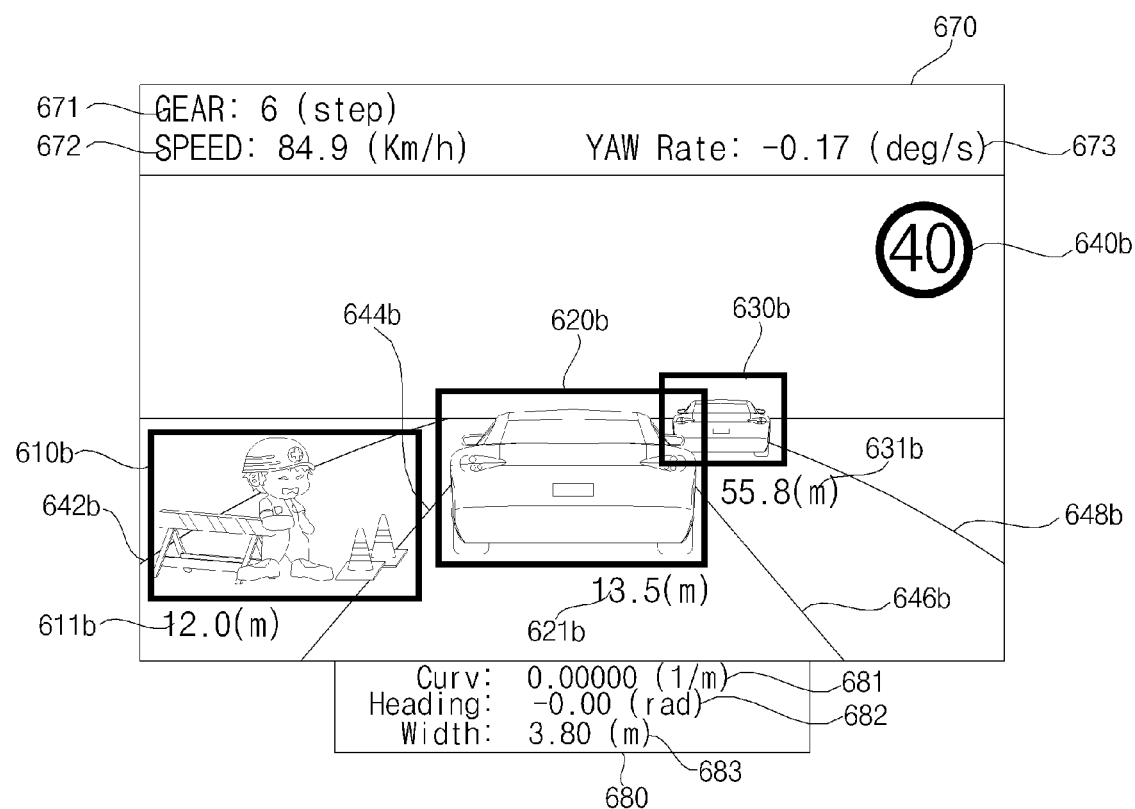

【FIG. 6】
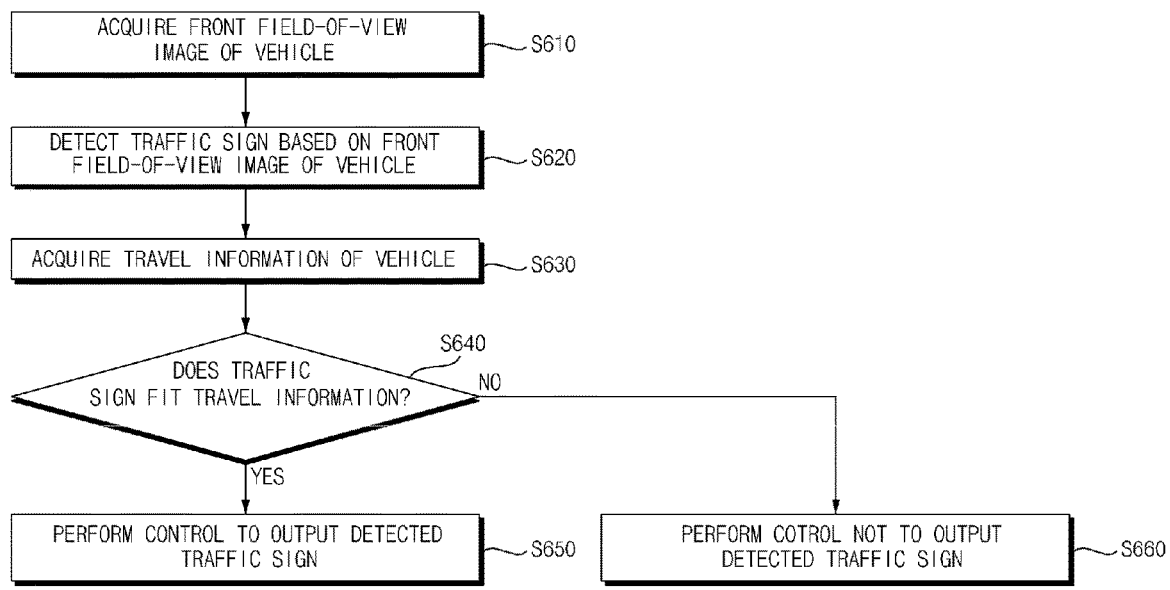

[FIG. 7]
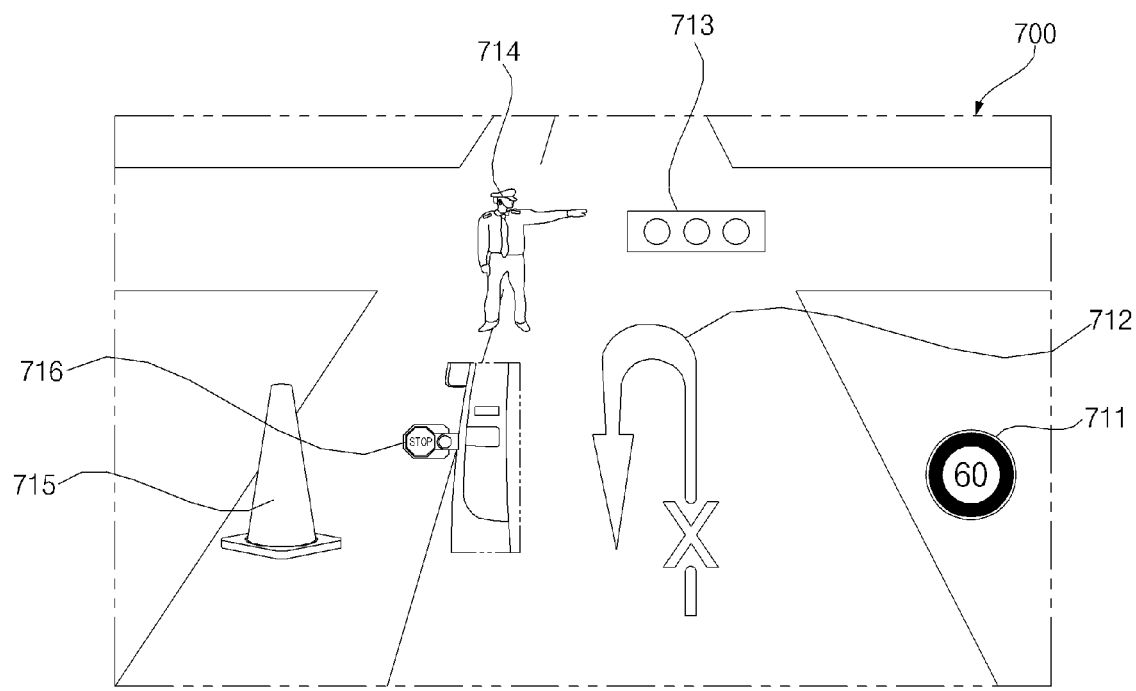

[FIG. 8]
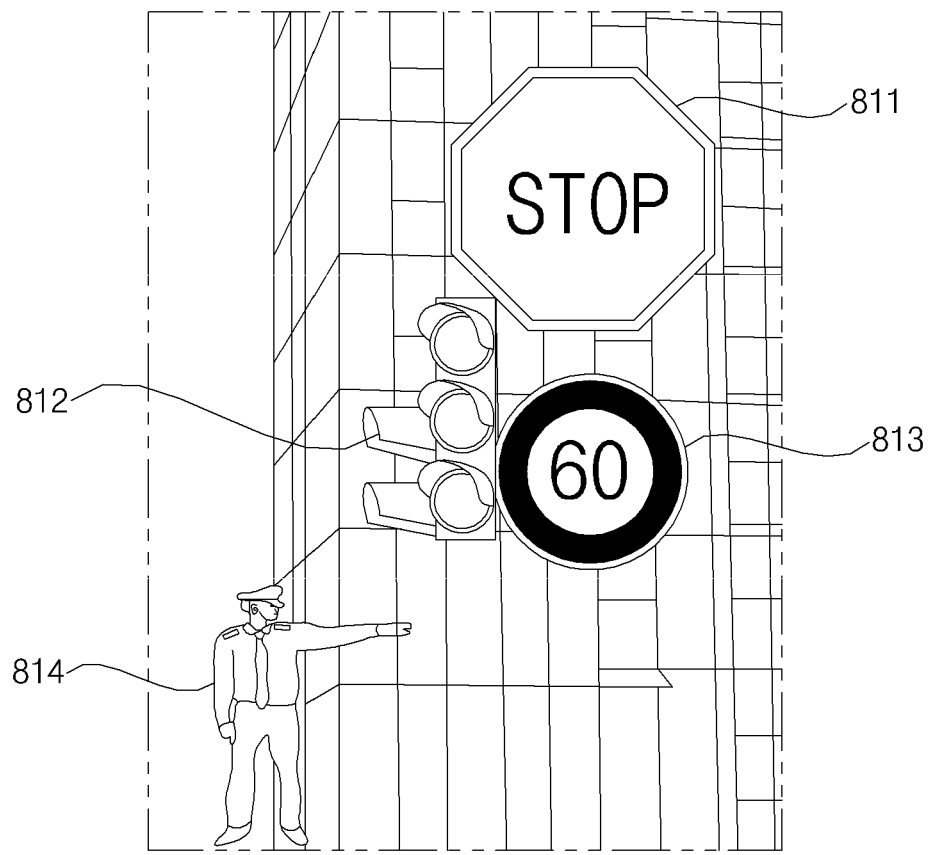

[FIG. 9]
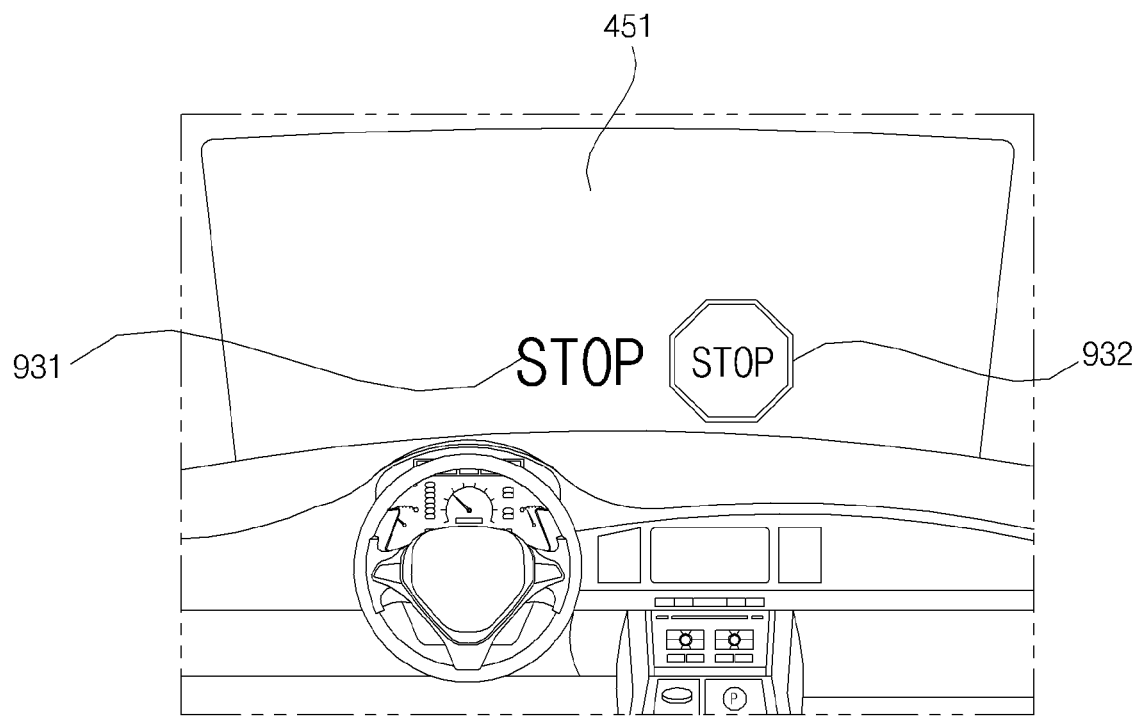

[FIG. 10]
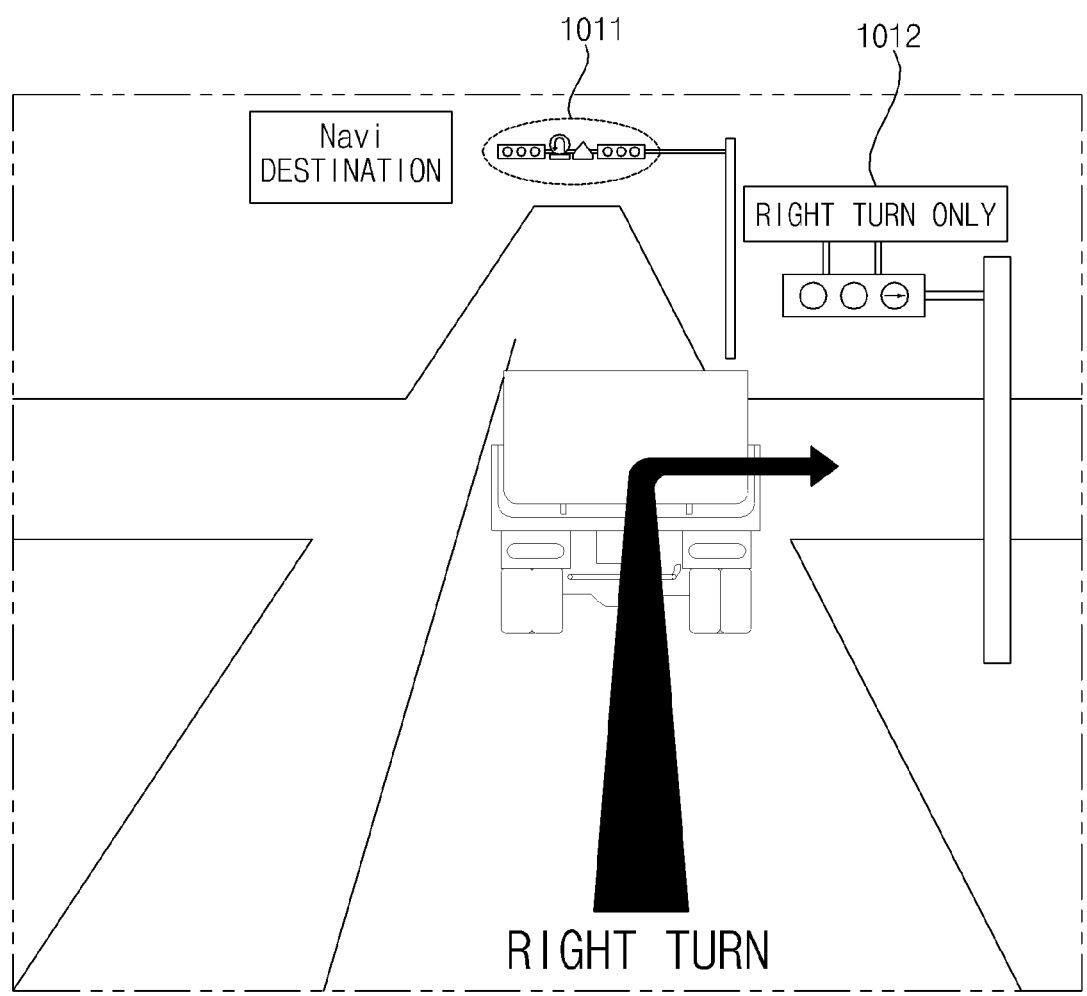

[FIG. 11]
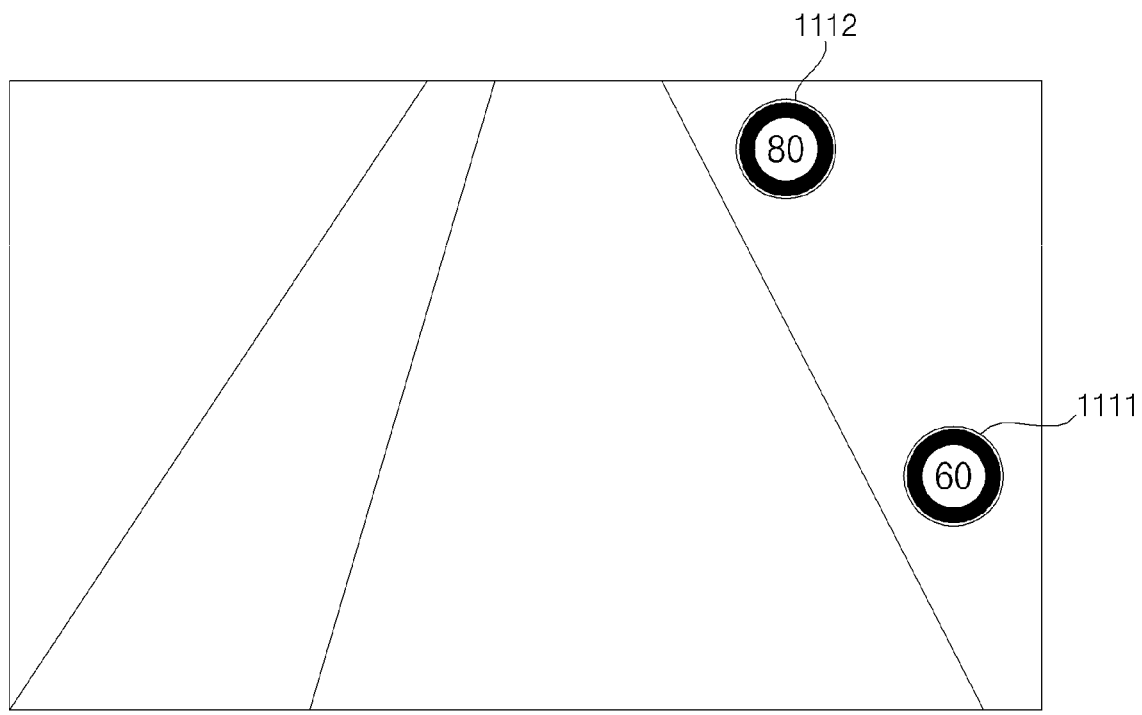

[FIG. 12]
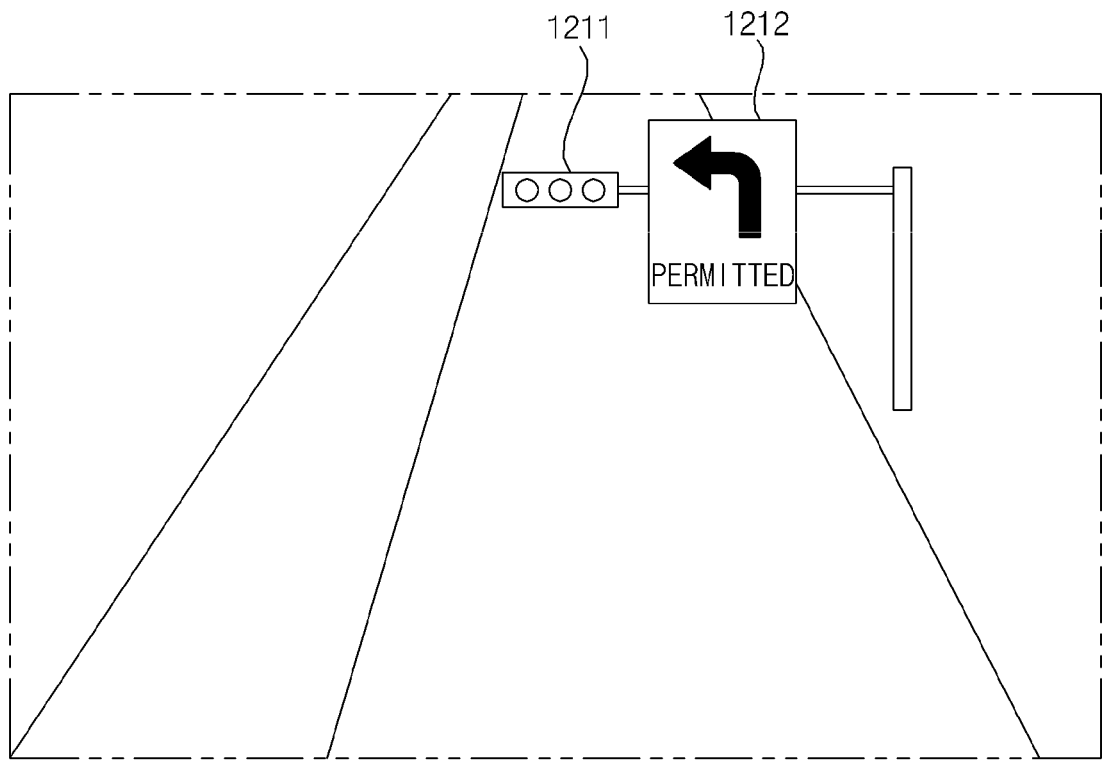

【FIG. 13】
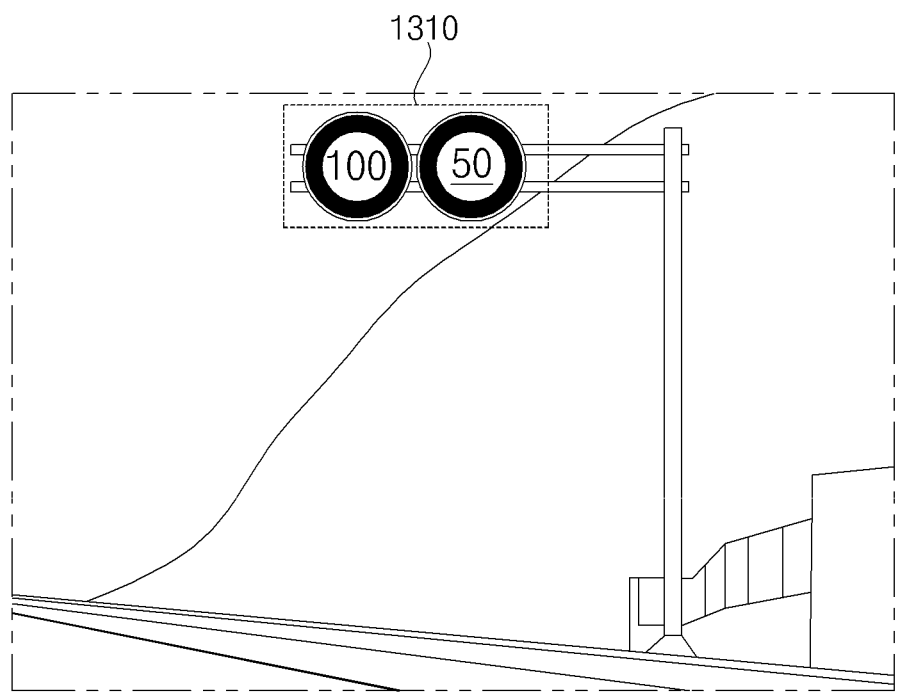

[FIG. 14]
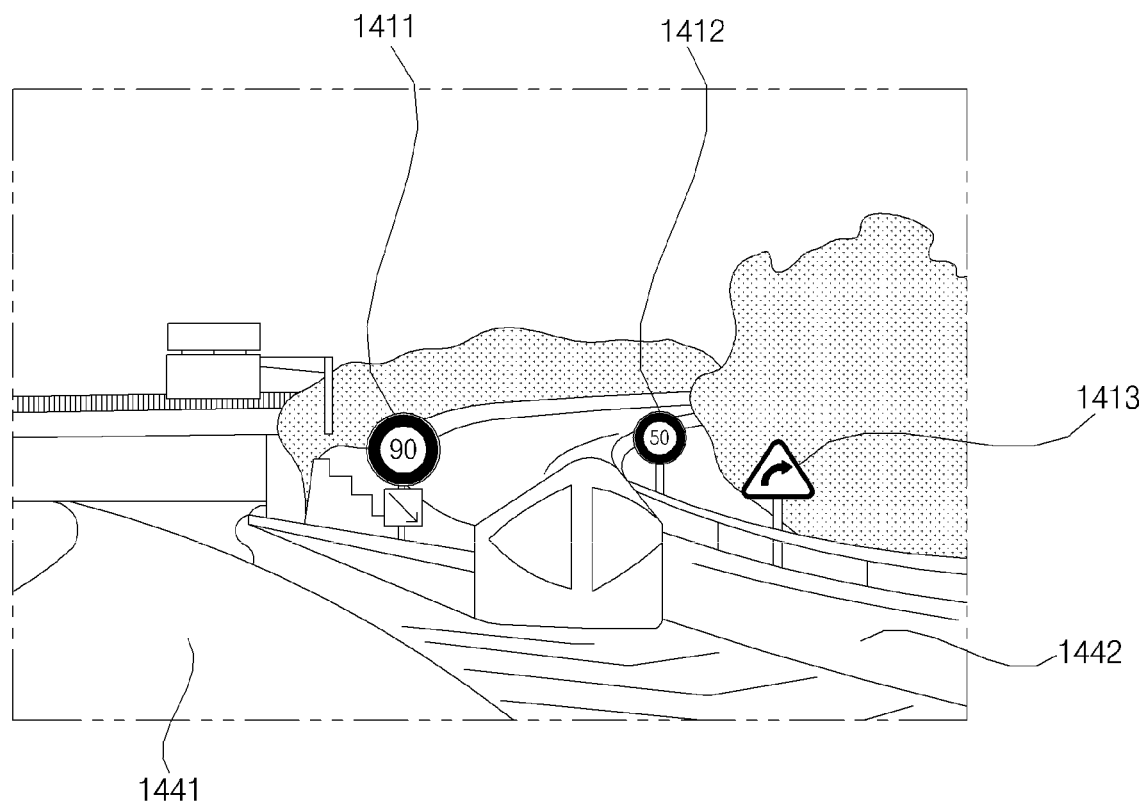

[FIG. 15]
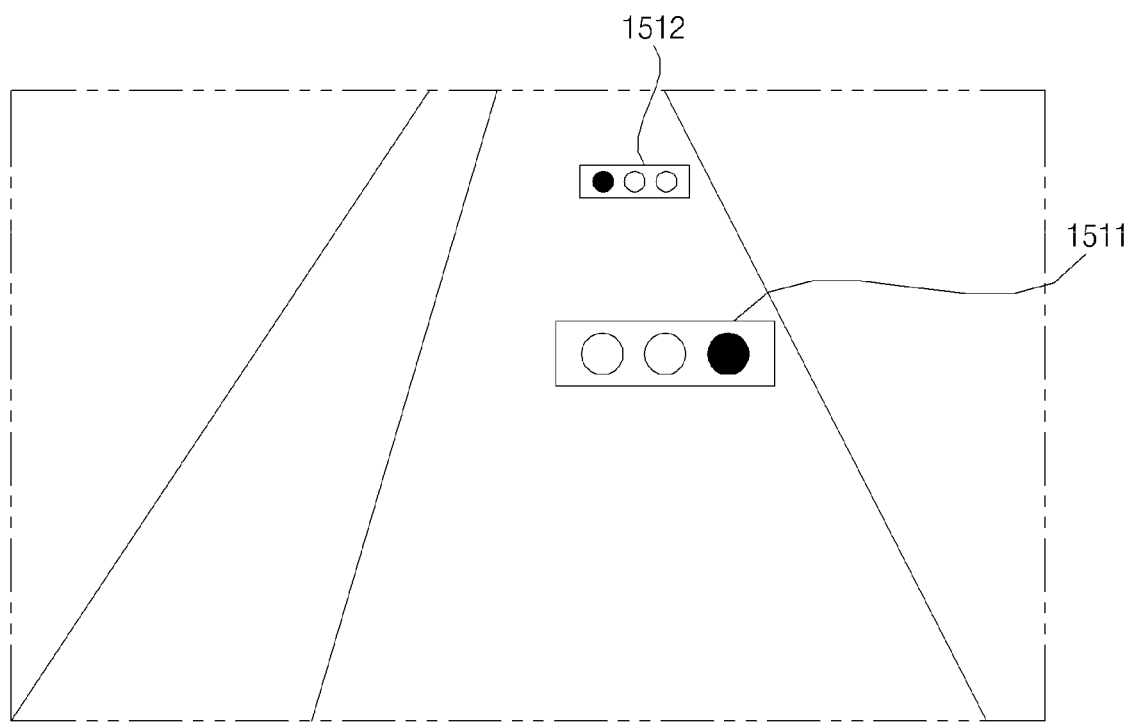

[FIG. 16]
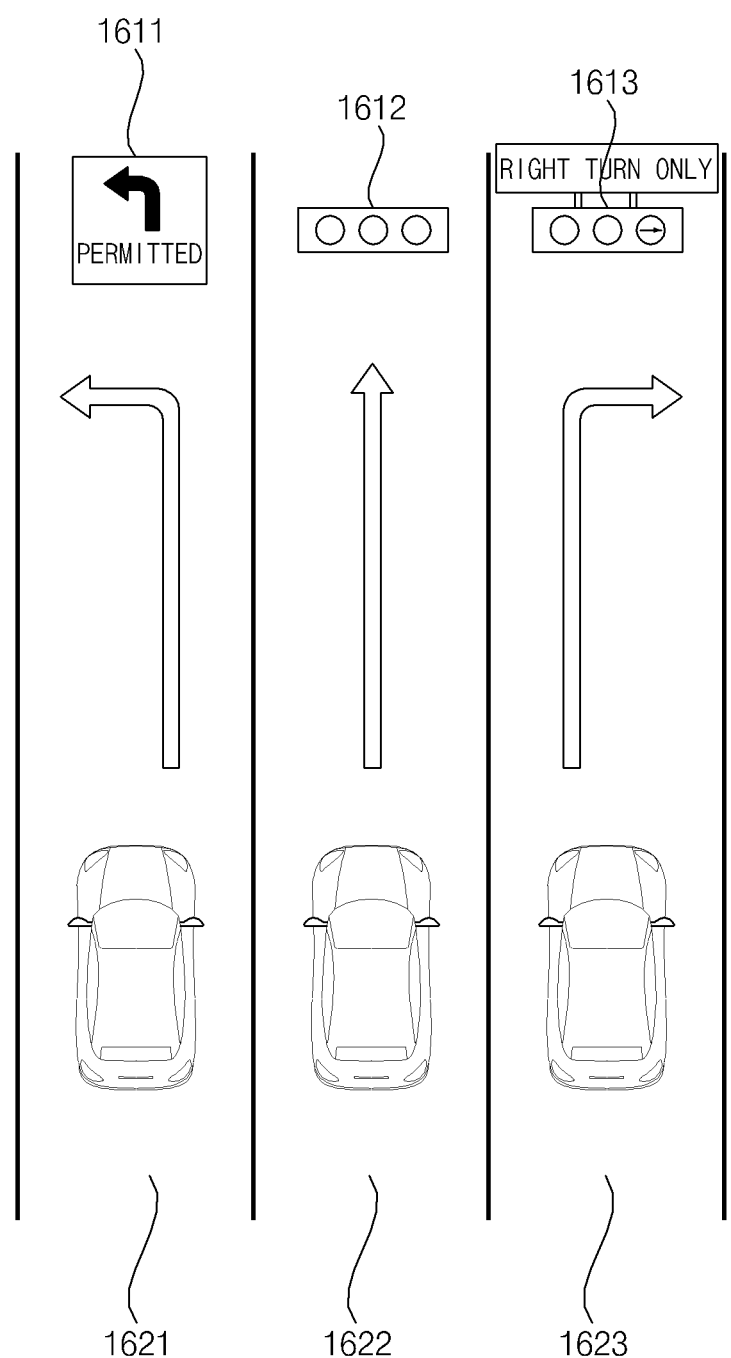

[FIG. 17]
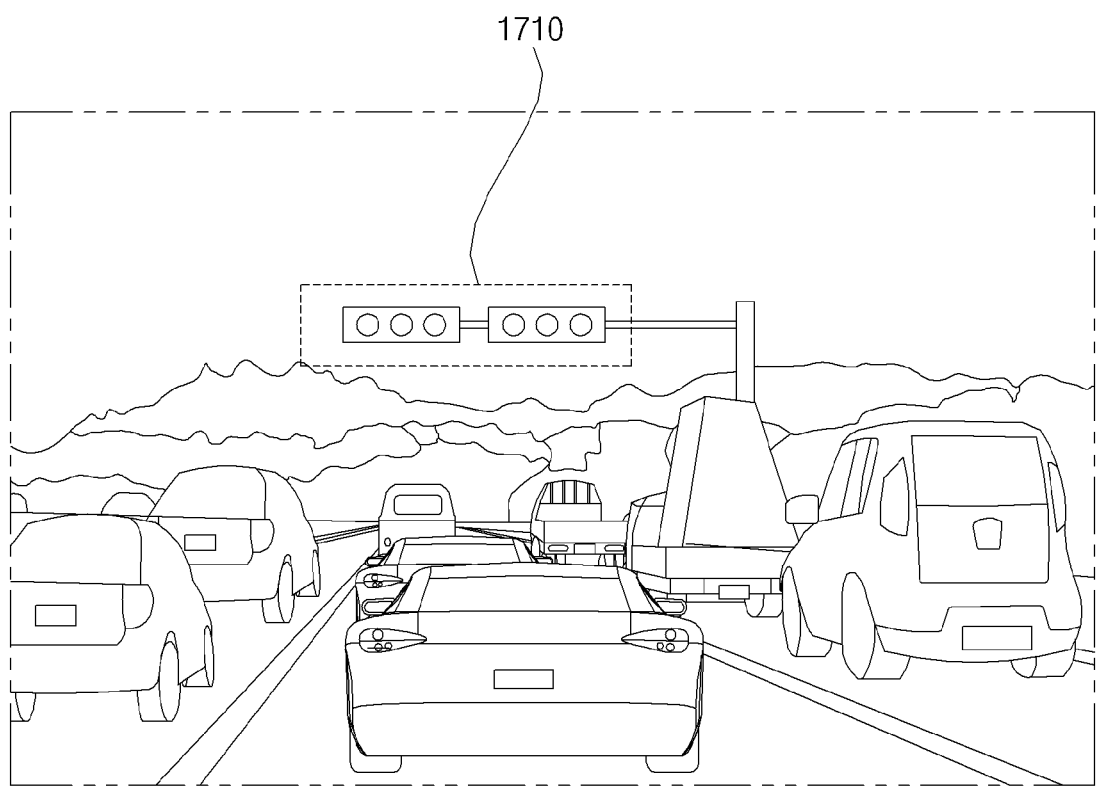

【FIG. 18】
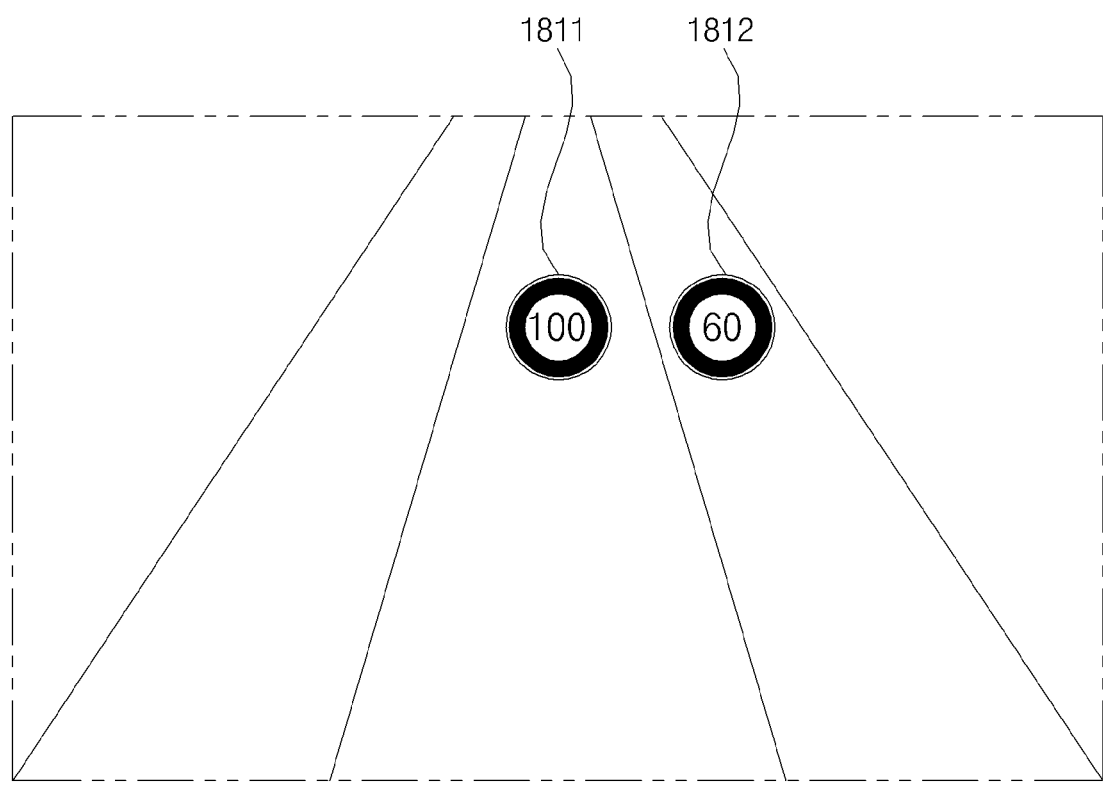

VEHICLE DRIVING ASSISTANCE DEVICE AND VEHICLE

CROSS-REFERENCE TO RELATED APPLICATIONS

This application is a National Stage application under 35 U.S.C. § 371 of International Application No. PCT/KR2016/013737, filed on Nov. 26, 2016, which claims the benefit of Korean Application No. 10-2016-0060974, filed on May 18, 2016. The disclosures of the prior applications are incorporated by reference in their entirety.

TECHNICAL FIELD

The present disclosure relates to a driver assistance apparatus provided in a vehicle, and the vehicle.

BACKGROUND ART

A vehicle is an apparatus that is motorized to move in a desired direction by control of a user riding therein. A typical example of the vehicle is an automobile.

Vehicles have been increasingly equipped with various sensors and electronic devices to provide user convenience. In particular, Advanced Driver Assistance Systems (ADAS)s are under development. Furthermore, efforts are being made to develop autonomous vehicles.

Traffic Sign Recognition (TSR) is one of the ADASs. The TSR is a system for detecting a traffic sign based on an acquired image and informing a driver of the detected traffic sign.

However, a TSR according to an existing technology simply detects a traffic sign and outputs relevant information and is not capable of operating in an manner suitable for a traveling situation. Specifically, when two contradictory traffic signs are detected, both of the two signs are output, leading confusion to a driver.

In addition, as any traffic signs are recklessly detected and output, this may rather disturb a driver to focus on driving.

DISCLOSURE

Technical Object

To solve the above problems, one object of the present invention is to provide a driver assistance apparatus that outputs only a traffic sign which fits a vehicle's travel information.

In addition, another object of the present invention is to provide a vehicle including the above driver assistance apparatus.

Objects of the present invention should not be limited to the aforementioned objects and other unmentioned objects will be clearly understood by those skilled in the art from the following description.

Technical Solution

To achieve the above objects, the present invention provides a driver assistance apparatus for a vehicle, including a camera configured to acquire a front field-of-view image of the vehicle; an output unit; and a processor configured to detect at least one traffic sign based on the front field-of-view image of the vehicle, determine whether the traffic sign fits travel information of the vehicle, and, when the traffic sign fits the travel information, perform control to output the traffic sign through the output unit.

The details of other embodiments are included in the following description and the accompanying drawings.

Advantageous Effects

According to embodiments of the present invention, there are one or more advantageous effects as follows.

First, only a traffic sign fitting a vehicle's travel information is output, thereby providing only information necessary for a driver and preventing unnecessary information.

Second, only an information item fitting to a situation among contradictory information items is output, preventing confusion to a driver.

Third, when a plurality of traffic signs is detected, the plurality of traffic signs are output according to a predetermined priority order, preventing an accident caused by distraction of a driver by the traffic signs.

Fourth, a traffic sign fitting to a driver's intention is output, thereby providing information necessary for the driver and preventing unnecessary information.

Effects of the present invention should not be limited to the aforementioned effects and other unmentioned effects will be clearly understood by those skilled in the art from the claims.

DESCRIPTION OF DRAWINGS

FIG. 1 shows the exterior of a vehicle according to an implementation of the present invention.

FIG. 2 is a block diagram illustrating a vehicle according to an embodiment of the present invention.

FIG. 3A is a perspective view of a camera for a vehicle according to an embodiment of the present invention. FIG. 3B is an exploded perspective view of a camera for a vehicle according to an embodiment of the present invention. FIG. 3C is a side view of a camera for a vehicle, which is cut along line A-B shown in FIG. 3A, according to an embodiment of the present invention.

FIG. 3D is a perspective view of a camera for a vehicle according to an embodiment of the present invention. FIG. 3E is an exploded perspective view of a camera for a vehicle according to an embodiment of the present invention. FIG. 3F is a side view of a camera for a vehicle, which is cut along line C-D shown in FIG. 3D, according to an embodiment of the present invention.

FIG. 4A is a block diagram illustrating a driver assistance apparatus according to an embodiment of the present invention.

FIG. 4B is a diagram illustrating internal configurations of a processor and a signal processing procedure by each configuration according to an embodiment of the present invention.

FIGS. 5A and 5B illustrate various examples of an internal block diagram of an image processor illustrated in FIG. 4B, and FIGS. 5C and 5D are diagrams illustrating operation of a processor illustrated in FIG. 5B. FIGS. 5E and 5F illustrate example operations of the driver assistance apparatus illustrated in FIGS. 5A to 5D.

FIG. 6 is a flowchart illustrating operation of a driver assistance apparatus according to an embodiment of the present invention.

FIG. 7 is a diagram illustrating an operation of detecting a traffic sign according to an embodiment of the present invention.

FIG. 8 is a diagram illustrating an operation of a driver assistance apparatus in response to detection of a plurality of traffic signs according to an embodiment of the present invention.

FIG. 9 is a diagram illustrating an operation of outputting a traffic sign according to an embodiment of the present invention.

FIG. 10 is a diagram illustrating a driver assistance apparatus in response to acquisition of a plurality of items of travel information according to an embodiment of the present invention.

FIG. 11 is a diagram illustrating an operation of outputting a traffic sign based on distance to a plurality of traffic signs according to an embodiment of the present invention.

FIG. 12 is a diagram illustrating an operation of outputting a traffic sign in response to detection of a plurality of traffic signs according to an embodiment of the present invention.

FIG. 13 is a diagram illustrating an operation of outputting an alarm by a driver assistance apparatus according to an embodiment of the present invention.

FIG. 14 is a diagram illustrating an operation of a driver assistance apparatus in response to entrance to a rampway according to an embodiment of the present invention.

FIG. 15 is a diagram illustrating an operation of a driver assistance apparatus in response to detection of a plurality of traffic lamps according to an embodiment of the present invention.

FIG. 16 is a diagram illustrating an operation of outputting a traffic sign fitting line information by a driver assistance apparatus according to an embodiment of the present invention.

FIG. 17 is a diagram illustrating an operation of a driver assistance apparatus in a congested area according to an embodiment of the present invention.

FIG. 18 is a diagram illustrating an operation of a driver assistance apparatus depending on a vehicle model according to an embodiment of the present invention.

BEST MODE

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification, and it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 shows the exterior of a vehicle according to an implementation of the present invention.

Referring to FIG. 1, a vehicle 100 may include wheels rotated by a power source, and a steering input device a for adjusting the travel direction of the vehicle 100.

According to an embodiment, the vehicle 100 may be an autonomous vehicle. If the vehicle 100 is an autonomous vehicle, the autonomous vehicle may be switched to an autonomous mode or a manual mode according to a user's input. When switched to the manual mode, the autonomous vehicle 100 may receive a driver's input for traveling through a drive manipulation device 121 (see FIG. 2).

The vehicle 100 may include a driver assistance apparatus 400. The driver assistance apparatus 400 is an apparatus which assists a driver based on information acquired by a variety of sensors. The driver assistance apparatus 400 may be referred to as an Advanced Driver Assistance System (ADAS).

In the following description, a camera 200 for a vehicle is mainly described as a sensor used in the driver assistance apparatus 400, but aspects of the present invention are not limited thereto. According to an embodiment, a Radar, a LiDar, an ultrasonic sensor, and an infrared sensor as well as the camera 200 may be used as a sensor.

In addition, in the following description, a mono camera 200a and a stereo camera 200b are mainly described as the camera 200 used in the driver assistance apparatus 400, but aspects of the present invention are not limited thereto. According to an embodiment, the camera 200 may include a triple camera, an Around View Monitoring (AVM) camera, a 350-degree camera, and an omnidirectional camera.

The drawing shows an example in which the camera 200 used in the driver assistance apparatus 400 is mounted onto a front windshield 10 so as to photograph a front view of the vehicle, but the camera 200 may photograph any of the front view, the rear view, the right-side view, and the left-side view of the vehicle. Accordingly, the camera 200 may be disposed at an appropriate position outside or inside the vehicle.

An overall length means the length between the front part and the rear part of the vehicle 100, an overall width means the width of the vehicle 100, and an overall height means the distance between the lower part of the wheel and the roof of the vehicle 100. In the following description, an overall length direction L may refer to a direction in which the overall length of the vehicle 100 is measured, an overall width direction W may refer to a direction in which the width of the vehicle 100 is measured, and an overall height direction H may refer to a direction in which the height of the vehicle 100 is measured.

FIG. 2 is a block diagram illustrating a vehicle according to an embodiment of the present invention.

Referring to FIG. 2, the vehicle 100 may include a communication unit 110, an input unit 120, a sensing unit 125, a memory 130, an output unit 140, a vehicle drive unit 150, a controller 170, an interface unit 180, a power supply unit 190 and the driver assistance apparatus 400.

The communication unit 110 may include a short-range communication module 113, a location information module 114, an optical communication module 115, and a V2X communication module 116.

The communication unit 110 may include one or more Radio Frequency (RF) circuits or devices to communicate with a different device.

The short-range communication module 113 is a module for short range communication and capable of supporting short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus).

The short-range communication module 113 may perform short-range communication between the vehicle 100 and at least one external device by establishing wireless area networks. For example, the short-range communication module 113 may wirelessly exchange data with a mobile terminal. The short-range communication module 113 may receive weather information and traffic information (e.g., transport protocol experts group (TPEG) information) from a mobile terminal. When a user enters the vehicle 100, a mobile terminal of the user and the vehicle 100 may be paired automatically or according to execution of an application by the user.

The location information module 114 is a module for acquiring a location of the vehicle 100 and a typical example thereof is a GPS (Global Positioning System) module. For example, the vehicle can acquire the location thereof using signals sent from a GPS satellite using the GPS module.

Meanwhile, according to an embodiment, the location information module 114 may be a component included in the sensing unit 125 instead of the communication unit 110.

The optical communication module 115 may include a light transmission unit and a light receiving unit.

The light receiving unit converts a light signal into an electrical signal so as to receive information. The light receiving unit may include a photodiode (PD) for receiving light. The photodiode converts light into an electrical signal. For example, the light receiving unit can receive information on a preceding vehicle through light emitted from a light source included in the preceding vehicle.

The light transmission unit may include at least one light-emitting element for converting an electrical signal into a light signal. Here, the light-emitting element is preferably an LED (Light Emitting Diode). The light transmission unit converts an electrical signal into a light signal and emits the light signal. For example, the light transmission unit may emit a light signal through flickering of the light-emitting element, which corresponds to a predetermined frequency. According to an embodiment, the light transmission unit may include a plurality of light-emitting element arrays. According to an embodiment, the light transmission unit may be integrated with a lamp provided to the vehicle 100. For example, the light transmission unit may be at least one of a headlight, a taillight, a brake light, a turn signal lamp and a sidelight. For example, the optical transmission module 115 may exchange data with another vehicle through optical communication.

The V2X communication module 116 is a module for wireless communication between the vehicle 100 and a server or other vehicles. The V2X communication module 116 includes a module in which a vehicle-to-vehicle communication (V2V) or vehicle-to-infrastructure communication (V2I) protocol can be implemented. The vehicle 100 can perform wireless communication with an external server or other vehicles through the V2X communication module 116.

The input unit 120 may include a driving manipulation device 121, a microphone 123 and a user input unit 124.

The driving manipulation device 121 receives user input for driving the vehicle 100. The driving manipulation unit 121 may include a steering input device, a shift input device, an acceleration input device and a brake input device.

The steering input device receives an input regarding a direction of travel of the vehicle from a user. The steering input device is preferably configured as a steering wheel such that steering input according to rotation can be applied. According to an embodiment, the steering input device may be configured in the form of a touchscreen, a touch pad, or a button.

The shift input device receives a parking (P) input, a drive (D) input, a neutral (N) input, and a reverse (R) input for the vehicle 100 from the user. The shift input means 121*b* is preferably formed into a lever. According to an embodiment, the shift input means 121*b* may be configured as a touch screen, a touchpad, or a button.

The acceleration input device receives an acceleration input for the vehicle 100 from the user. The brake input device receives a deceleration input for the vehicle 100 from the user. The acceleration input device and the brake input device are preferably formed into pedals. According to an embodiment, the acceleration input means 121*c* or the brake input device may be configured as a touch screen, a touchpad, or a button.

The microphone 123 may process an external audio signal into electrical data. The processed data may be used in various manners according to functions executed in the vehicle 100. The microphone 123 may convert a voice command of the user into electrical data. The converted electrical data may be transmitted to the controller 170.

Meanwhile, according to an embodiment, the camera 122 or the microphone 123 may be included in the sensing unit 125 instead of the input unit 120.

The user input unit 124 is configured to receive information from the user. Upon input of information through the user input unit 124, the controller 170 may control an operation of the vehicle 100 in correspondence with the input information. The user input unit 124 may include a touch input means or a mechanical input means. According to an embodiment, the user input unit 124 may be disposed in an area of a steering wheel. In this case, the driver may manipulate the user input unit 124 with his or her finger, while grabbing the steering wheel.

The sensing unit 160 may sense various situations of the vehicle 100 and situations outside the vehicle. For this purpose, the sensing unit 160 may include a collision sensor, a steering sensor, a speed sensor, an inclination sensor, a weight sensor, a heading sensor, a yaw sensor, a gyro sensor, a position module, a vehicle forward/backward movement sensor, a battery sensor, a fuel sensor, a tire sensor, a steering sensor, an in-vehicle temperature sensor, an in-vehicle humidity sensor, an ultrasonic sensor, an illumination sensor, an acceleration pedal position sensor, a brake sensor, etc.

The sensing unit 160 may acquire sensing signals for vehicle collision information, vehicle heading information, vehicle location information (GPS information), vehicle angle information, vehicle speed information, vehicle acceleration information, vehicle tilt information, vehicle forward/backward movement information, battery information, fuel information, tire information, vehicle lamp information, in-vehicle temperature information, in-vehicle humidity information, steering information, external illumination, pressure applied to an acceleration pedal, pressure applied to a brake pedal, etc.

In addition, the sensing unit 125 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The location information module 114 may be classified as a component of the sensing unit 125.

The sensing unit 125 may include an object sensor for sensing an object around the vehicle. The object sensor may include a camera module, a radar, a lidar and an ultrasonic sensor. In this case, the sensing unit 125 can sense an object in front of the vehicle or an object behind the vehicle through the camera module, radar, lidar or ultrasonic sensor.

According to an embodiment, the object sensing unit may be classified as a component of the driver assistance apparatus 400.

The memory 130 is electrically connected with the controller 170. The memory 130 may store basic data for a unit, control data for controlling an operation of the unit, and input and output data. The memory 130 may be any of various storage devices in hardware, such as Read Only Memory (ROM), Random Access Memory (RAM), Erasable and Programmable ROM (EPROM), flash drive, hard drive, etc. The memory 130 may store various data for overall operations of the vehicle 100, such as programs for processing or controlling in the controller 170.

The output unit 140 is configured to output information processed by the controller 170 and may include a display device 141, a sound output unit 142, and a haptic output unit 143.

The display device 141 may display various graphical objects. For example, the display device 141 can display vehicle related information. Here, the vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle.

The display device 141 may include at least one of a liquid crystal display (LCD), a thin film transistor-liquid crystal display (TFT LCD), an organic light emitting diode (OLED), a flexible display, a 3D display, or an e-ink display.

The display device 141 may form a layered structure with a touch sensor or be integrally formed integrated with the touch sensor so as to implement a touch screen. The touch-screen may function as a user input unit 724 providing an input interface between the vehicle 100 and the user, and, at the same timey, provides an output interface between the vehicle 100 and the user. In this case, the display device 141 may include a touch sensor for sensing a touch applied to the display device 141 such that a control command is input to the display device 141 through the touch. When a touch is applied to the display device 141, the touch sensor may sense the touch and the controller 170 can generate a control command corresponding to the touch on the basis of the sensed touch. Input applied through touch may be text, figures or menu items which can be instructed or designated in various modes.

The display device 141 may include a cluster to enable the driver to drive the vehicle and, simultaneously, to check vehicle state information or vehicle driving information. The cluster may be provided on the dashboard. In this case, the driver may be able to check information displayed on the cluster while looking forward.

Meanwhile, according to an embodiment, according to embodiment, the display device 141 may be implemented as an HUD (Head Up Display). When the display device 141 is implemented as an HUD, information can be output through a transparent display provided to the windshield of the vehicle. Alternatively, the display device 141 may include a projection module so as to output information through an image projected onto the windshield.

Meanwhile, according to an embodiment, the display device 141 may include a transparent display. In this case, the transparent display may be attached to the front windshield 10.

The transparent display may display a predetermined screen with predetermined transparency. For transparency, the transparent display may include at least one of a transparent TFEL (Thin Film Electroluminescent) display, a transparent OLED (Organic Light-Emitting Diode) display, a transparent LCD (Liquid Crystal Display), a transmission type transparent display, or a transparent LED (Light Emitting Diode) display. The transparency of the transparent display may be controlled.

According to an embodiment, the display device 141 may function as a navigation device.

The sound output unit 142 converts an electrical signal from the controller 17—into an audio signal and outputs the audio signal. To this end, the sound output unit 142 may include a speaker or the like. The sound output unit may be able to output sound corresponding to operation of the user input unit 724.

The haptic output unit 143 may generate a tactile output. For example, the haptic output unit 143 may vibrate the steering wheel, a safety belt, or a seat to enable the user to recognize haptic output.

The vehicle drive unit 150 may control operations of various devices of the vehicle. The vehicle drive unit 150 may include a power source driver 151, a steering driver 152, a brake driver 153, a lamp driver 154, an air-conditioner driver 155, a window driver 156, an airbag driver 157, a sunroof driver 158 and a suspension driver 159.

The power source driver 151 can perform electronic control of a power source of the vehicle 100.

For example, when the power source is a fossil fuel based engine (not shown), the power source driver 151 can perform electronic control of the engine so as to control the output torque of the engine. When the power source driver 151 is an engine, the speed of the vehicle can be limited by restricting an engine output torque under the control of the controller 170.

Alternatively, when an electric motor (not shown) is a power source, the power source driver 151 may control the motor. Accordingly, revolutions per minute (RPM), torque and the like of the motor can be controlled.

The steering driver 152 may electronically control a steering apparatus of the vehicle 100 so as to steer the vehicle 100.

The brake driver 153 may electronically control a brake apparatus (not shown) of the vehicle 100. For example, the brake driver 153 can reduce the speed of the vehicle 100 by controlling the operation of a brake provided to the wheels. As another example, the brake driver 153 may adjust the direction of the vehicle 100 to the left or right by differently operating brakes respectively provided to the left and right wheels.

The lamp driver 154 may turn on/turn off lamps provided inside and outside the vehicle 100. In addition, the lamp driver 154 may control illuminance, directions and the like of the lamps. For example, the lamp driver 154 may control a turn signal lamp, a brake lamp, and the like.

The air-conditioner driver 155 may electronically control an air conditioner (not shown) of the vehicle 100. For example, the air-conditioner driver 155 can control the air conditioner to supply cool air to the inside of the vehicle 100 when the interior temperature of the vehicle is high.

The window driver 156 may electronically control a window apparatus of the vehicle 100. For example, the window driver 156 may control opening or closing of left and right windows provided to the side of the vehicle.

The airbag driver 157 may electronically control an airbag apparatus provided inside the vehicle 100. For example, the airbag driver 157 may control the airbag apparatus to be developed in a dangerous situation.

The sunroof driver 158 may electronically control a sunroof apparatus (not shown) of the vehicle 100. For example, the sunroof driver 158 may control opening or closing of a sunroof.

The suspension driver 159 may electronically control a suspension apparatus (not shown) of the vehicle 100. For example, the suspension driver 159 may reduce vibration of the vehicle 100 by controlling the suspension apparatus when the surface of the road is rough.

According to embodiment, the vehicle driving unit 150 may include a chassis driver. The chassis driver may include the steering driver 152, brake driver 153 and suspension driver 169.

The controller 170 may control operations of the respective units of the vehicle 100. The controller 170 may be called an ECU (Electronic Control Unit).

The controller 170 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, or electrical units for performing other functions.

The interface 180 may serve as a passage between the vehicle 100 and various external devices connected to the vehicle 100. For example, the interface 180 may include a port connectable to a mobile terminal and may be connected to the mobile terminal through the port. In this case, the interface 180 can exchange data with the mobile terminal.

The interface 180 may serve as a passage through which electric energy is supplied to the mobile terminal connected thereto. When the mobile terminal is electrically connected to the interface 180, the interface 180 can provide electric energy supplied from the power supply unit 190 to the mobile terminal under the control of the controller 170.

The power supply unit 190 may provide power necessary for operations of the components of the vehicle 100 under the control of the controller 170. The power supply unit 170 may be supplied with power from a battery (not shown) included in the vehicle.

The driver assistance apparatus 400 may assist a driver in driving the vehicle. The driver assistance apparatus 400 may include the camera 200.

The vehicle 200 may include a mono camera 200a illustrated in FIGS. 3A to 3C, and a stereo camera 200b illustrated in FIGS. 3D to 3F.

The camera 200 may be referred to as a camera device for a vehicle.

FIG. 3A is a perspective view of a camera for a vehicle according to an embodiment of the present invention. FIG. 3B is an exploded perspective view of a camera for a vehicle according to an embodiment of the present invention. FIG. 3C is a side view of a camera for a vehicle, which is cut along line A-B shown in FIG. 3A, according to an embodiment of the present invention.

A camera 200 for a vehicle described with reference to FIGS. 3A to 3C is a single camera 200a.

The camera 200a may include a lens 211, an image sensor 214, and a processor 470.

According to an embodiment, the camera 200a may further include a processing board 220, a light shield 230, a heat dissipation member 240, and a housing 250 individually or in combination.

Meanwhile, the housing 250 may include a first housing 251, a second housing 252, and a third housing 253.

The lens 211 may be housed in the lens housing in a manner in which the lens 211 is fastened by a nut 212 so as to be held in a hole 219 formed at one portion of the first housing 251.

The image sensor 214 may include at least one photoelectric conversion device capable of converting an optical signal into an electrical signal. For example, the image sensor 214 may be a charge-coupled device (CCD) or a complimentary metal-oxide semiconductor (CMOS).

The image sensor 214 may be disposed at an appropriate position outside or inside the vehicle in order to acquire images of the outside of the vehicle or images of the inside of the vehicle.

For example, the image sensor 214 may be disposed in proximity of a front windshield 10 in the interior of the vehicle in order to acquire a front field-of-view image of the vehicle.

Alternatively, the image sensor 214 may be disposed around a front bumper or a radiator.

For example, the image sensor 214 may be disposed in proximity of a rear windshield in the interior of the vehicle in order to acquire a rear field-of-view image of the vehicle. Alternatively, the image sensor 214 may be disposed around a rear bumper, a trunk, or a tailgate.

For example, the image sensor 214 may be disposed in proximity of at least one side window in the interior of the vehicle in order to acquire a lateral field-of-view image of the vehicle.

Alternatively, the image sensor 214 may be disposed around a side mirror, a fender, or a door.

The image sensor 214 may be disposed at rear of the lens 211 in order to acquire an image based on light introduced through the lens 211. For example, the image sensor 214 may be disposed vertical to the ground with a predetermined distance spaced apart from the lens 211.

The processor 470 may be connected with the image sensor 214. The processor 470 may computer-process an image acquired by the image sensor 214. The processor 470 may control the image sensor 214.

The processor 470 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units for performing other functions.

The processor 470 may be mounted on the processing board 220. The processor 270 and a memory 440 may be mounted on the processing board 220.

The processing board 220 may be disposed as being inclined in an overall length direction. For example, a front surface or a rear surface of the processing board 220 may be disposed to face the front windshield 10. For example, the processing board 220 may be disposed in parallel with the front windshield 10.

The front windshield 10 provided in a vehicle 100 may be generally formed from a bonnet to a roof of the vehicle 100 to be inclined at a predetermined angle relative to the ground. In this case, the processing board 220 is disposed to be inclined in the overall length direction, and hence, the camera 200a may be formed smaller in size compared to the case where the processing board 220 is disposed vertically or horizontally. There is an advantage in that a more space in the vehicle 100 may be secured as much as an amount by which the camera 200a is reduced in size.

A plurality of devices or electronic components may be mounted on the processing board 220. In this case, heat may be generated due to the plurality of devices of components included in the processing board 220.

The processing board 220 may be disposed as being spaced apart from the image sensor 241. Since the processing board 220 is disposed as being spaced apart from the image sensor 241, the heat occurring in the processing board 220 may not affect performance of the image sensor 241.

The processing board 220 may be disposed at an optimum position such that the heat generated in the processing board 220 is prevented from affecting the image sensor 241. Specifically, the processing board 220 may be disposed under the image sensor 241. Alternatively, the processing board 220 may be disposed at the front of the image sensor 241.

One or more memories 440 may be mounted on the processing board 220. A memory 440 may store images acquired by the image sensor 241, data of various applications, data required to control the processor 470, or data processed by the processor 470. Like the processor 470, the memory 440 is one of major heat generating devices. With the processor 470 disposed at the center of the processing board 220, the memory 440 may be disposed around the processor 470. For example, one or memory 440 may be disposed to surround the processor 470 positioned at the center. In this case, the processor 470 and the memories 440, which are heat generating devices, may be disposed at positions most distal from the image sensor 241.

The processor 470 may be electrically connected with a controller 170. The processor 470 may be controlled by the controller 170.

The light shield 230 may be disposed at the front of the lens 211. The light shield 230 may shield light unnecessary to acquire an image such that the light is not introduced into the lens 211. For example, the light shield 230 may shield light reflected from the windshield 10, a dashboard of the vehicle, or the like. In addition, the light shield 230 may shield light generated by an unnecessary light source.

The light shield 230 may have a partition structure. For example, the light shield 230 may have a lower partition structure. Meanwhile, the shape of the light shield 230 may vary depending on a vehicle model. For example, a curvature of the windshield and an angle formed by the windshield and the ground may vary depending on a vehicle model, and hence, the light shield 230 may have a shape corresponding to a vehicle model on which the camera 200a is installed. To this end, the light shield 230 may have a detachable structure.

The heat dissipation member 240 may be disposed at the rear end of the image sensor 214. The heat dissipation member 240 may contact the heat dissipation member 240 or an image sensor board on which the image sensor 214 is mounted. The heat dissipation member 240 may handle heat occurring in the image sensor 214.

As described above, the image sensor 241 is sensitive to heat. The heat dissipation member 240 may be disposed between the image sensor 214 and the third housing 253. The heat dissipation member 240 may be disposed to contact the image sensor 214 and the third housing 253. In this case, the heat dissipation member 240 may dissipate heat through the third housing 253.

For example, the heat dissipation member 240 may be any one of a thermal pad and a thermal grease.

The housing 250 may include the lens housing 217, the first housing 251, the second housing 252, and the third housing 253.

The lens housing 217 may accommodate at least one lens 211 and protect the lens 211 from an external impact.

The first housing 251 may be formed to surround the image sensor 241. The first housing 251 may include the hole 219. While being accommodated in the lens housing and held in the hole 219, the lens 211 may be connected with the image sensor 214.

The first housing 251 may be formed to increase in thickness in a direction toward the image sensor 214. For example, the first housing 251 may be formed by die casting. In this case, in order to prevent degradation of performance of the image sensor 214 caused by heat, a portion of the first housing 251 in proximity to the image sensor 214 may be formed thicker than other portions.

The first housing may be formed with a thickness greater than a thickness of the third housing 253. If a housing has a great thickness, heat is delivered slowly. Thus, in the case where the first housing 251 is formed with a thickness greater than a thickness of the third housing 253, heat generated in the camera 200a may be dissipated through the third housing 253 rather than the first housing 251 which is disposed in proximity to the front windshield such that heat dissipation is hard to be carried out.

Meanwhile, according to an embodiment, the lens housing 217 and the first housing 251 may be integrally formed as one body.

The second housing 252 may be disposed at the front end of the processing board 220. The second housing 252 may be fastened to the first housing 251 and the third housing 253 using a predetermined fastening means.

The second housing 252 may include an attachment means to allow the light shield to be attached thereto. The light shield 230 may be attached to the second housing 252 using the attachment means.

The first and second housing 252 and 253 may be formed of a synthetic resin material.

The third housing 253 may be fastened to the first housing 251 and the second housing 252 using a predetermined fastening means. According to an embodiment, the first to third housing 251, 252, and 253 may be integrally formed as one body.

The third housing 253 may be formed to surround the processing board 220. The third housing 253 may be disposed at the rear or lower end of the processing board 220. The third housing 253 may be formed of a thermally conductive material. For example, the third housing 253 may be formed of a metal such as aluminum. Since the third housing 253 is formed of a thermally conductive material, heat may be dissipated efficiently.

In the case where the first and second housings 251 and 252 are formed of a synthetic resin material and the third housing 253 is formed of a thermally conductive material, heat inside the camera for the vehicle may be dissipated through the third housing 253 rather than the first and second housings 251 and 252. That is, in the case where the camera 200a is mounted on a windshield, the first and second housings 251 and 252 may be disposed in proximity to the windshield and hence heat cannot be dissipated through the first and second housings 251 and 252. In this case, the heat may be efficiently dissipated through the third housing 253.

Meanwhile, in the case where the third housing 253 is formed of aluminum, it may be advantageous in protecting internal components (e.g., the image sensor 241 and the processor 470) from electro-magnetic compatibility (EMC) and electrostatic discharge (ESC).

The third housing 253 may contact the processing board 220. In this case, the third housing 253 may transfer heat through a portion thereof in contact with the processing board 220, thereby efficiently dissipating the heat to an outside.

The third housing 253 may further include a heat dissipation unit 291. For example, the heat dissipation unit 291 may include at least one of a heat sink, a heat dissipation fin, a thermal pad, or a thermal grease.

The heat dissipation unit 291 may dissipate heat generated in the camera 200a to an outside. For example, the heat dissipation unit 291 may be disposed between the processing board 220 and the third housing 253. The heat dissipation unit 291 may contact the processing board 220 and the third housing 253 to dissipate heat generated in the interior of the processing board 220.

The third housing 253 may further include an air outlet. The air outlet is a hole for dissipating high-temperature air in the camera 200a to the outside of the camera 200a. The camera 200a may include an air flow passage connected to the air outlet. The air flow passage may guide high-temperature air in the camera 200a toward the air outlet.

The camera 200a may further include a moisture-proof unit. The moisture-proof unit may be formed in the shape of patch attached to the air outlet. The moisture-proof unit may be a moisture-proof unit formed of Gore-Tex material. The moisture-proof unit may discharge humid air inside the camera 200a to the outside. In addition, the moisture-proof unit may prevent humid air outside the camera 200a from coming inside.

FIG. 3D is a perspective view of a camera for a vehicle according to an embodiment of the present invention. FIG. 3E is an exploded perspective view of a camera for a vehicle according to an embodiment of the present invention. FIG. 3F is a side view of a camera for a vehicle, which is cut along line C-D shown in FIG. 3D, according to an embodiment of the present invention.

A camera 200 for a vehicle described with reference to FIGS. 3D to 3F is a stereo camera 200b.

Description about the single camera 200a with reference to FIGS. 3A to 3C may apply to the stereo camera 200b. That is, a first camera and a second camera included in the stereo camera 200b may be the camera described with reference to FIGS. 3A to 3C. The stereo camera 200b may include a first lens 211a, a second lens 211b, a first image sensor 214a, a second image sensor 214b, and a processor 470a.

According to an embodiment, the camera 200b may further include a processing board 220a, a first light shield 230a, a second light shield 230b, and a housing 250a individually or in combination.

Meanwhile, the housing may include a first lens housing 217a, a second lens housing 217b, a first housing 251a, a second housing 252a, and a third housing 253a.

Description about the lens 211 illustrated in FIGS. 3A to 3C may apply to the first lens 211a and the second lens 211b.

Description about the image sensor 214 illustrated in FIGS. 3A to 3C may apply to the first image sensor 214a and the second image sensor 214b.

Meanwhile, a module including the first lens 211a and the first image sensor 214a may be referred to as a first image acquisition module. In addition, a module including the second lens 211b and the second image sensor 214b may be referred to as a second image acquisition module.

The processor 470a may be electrically connected with the first image sensor 214a and the second image sensor 214b. The processor 470 may computer-process images processed by the first image sensor 214a and the second image sensor 214b. In this case, the processor 470 may form a disparity map or calculate a disparity based on the images acquired by the first image sensor 214a and the second image sensor 214b.

The processor 470a may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units for performing other functions.

The processor 470a may be mounted on the processing board 220a. Description about the processing board 220 illustrated in FIGS. 3A to 3C may apply to the processing board 220a.

Description about the light shield 230 illustrated in FIGS. 3 to 5 may apply to the first light shield 230a and the second light shield 230b.

Description about the lens housing 217 illustrated in FIGS. 3 to 5 may apply to the first lens housing 217a and the second lens housing 217b.

Description about the first housing 251 illustrated in FIGS. 3A to 3C may apply to the first housing 251a.

Description about the second housing 252 illustrated in FIGS. 3A to 3C may apply to the second housing 252a.

Description about the third housing 253 illustrated in FIGS. 3A to 3C may apply to the third housing 253a.

FIG. 4A is a block diagram illustrating a driver assistance apparatus according to an embodiment of the present invention.

Referring to FIG. 4A, a driver assistance apparatus 400 may include a camera 200 for a vehicle, a processor 470, an interface unit 430, a memory 440, and an output unit 450.

According to an embodiment, the driver assistance apparatus 400 may further include a communication unit 410, an input unit 420, and a power supply 440 individually or in combination.

According to an embodiment, unlike the example shown in FIG. 4A, the processor 470, the interface unit 430, and the memory 440 may be classified as subordinate components of the camera 200. In this case, the camera 200 may function as the driver assistance apparatus 200.

The camera 200 may be mounted at one portion of a vehicle 100 and acquire an image.

For example, the camera 200 may be disposed in proximity of a front windshield 10 in the interior of the vehicle in order to acquire a front field-of-view image of the vehicle. Alternatively, the camera 200 may be disposed around a front bumper or a radiator grill.

For example, the camera 200 may be disposed in proximity to a rear windshield in the interior of the vehicle in order to acquire a rear field-of-view image of the vehicle. Alternatively, the camera 200 may be disposed around a rear bumper, a trunk, or a tailgate.

For example, the camera 200 may be disposed in proximity to at least one side window in the interior of the vehicle in order to acquire a lateral field-of-view image of the vehicle.

Alternatively, the camera 200 may be disposed around a side mirror, a fender, or a door.

The camera 200 may include an image sensor 214 and an actuator 401.

The image sensor 214 is the same as described with reference to FIGS. 3A to 3F.

According to an embodiment, the camera 200 may be the stereo camera 200b (see FIGS. 3D to 3F).

In the case where the camera 200 is the stereo camera 200b, the camera 200 may include a first camera, a second camera, and the processor 470.

The interface unit 430 may receive a variety of signals, information, or data. The interface unit 430 may transmit a signal, information, or data processed or generated by the processor 470. To this end, the interface unit 430 may perform data communication with a controller 170, a display device 141 for the vehicle, a sensing unit 125, and a vehicle drive unit 150 in the vehicle by a wireless or wired communication method.

The interface unit 430 may receive sensor information from the controller 170 or the sensing unit 125.

Here, the sensor information may include at least one of the following: vehicle heading information, vehicle location information (Global Positioning System (GPS) information), vehicle angle information, vehicle speed information, vehicle steering information, vehicle acceleration information, vehicle tilt information, vehicle drive/reverse information, battery information, fuel information, tire information, vehicle lamp information (e.g., turn signal information), in-vehicle temperature information, in-vehicle humidity information, and information on whether or not it is raining.

The sensor information may be acquired from a heading sensor, a yaw sensor, a gyro sensor, a position module, a vehicle drive/reverse sensor, a wheel sensor, a vehicle speed sensor, a steering angle sensor, a vehicle tilt sensor, a battery sensor, a fuel sensor, a tire sensor, a sensor for sensing steering in response to rotation of a steering wheel, in-vehicle temperature sensor, in-vehicle humidity sensor, a rain sensor, etc. Meanwhile, the position module may include a GPS module for receiving GPS information.

The interface unit 430 may receive navigation information through data communication with the controller 170, the display device 141, or an additional navigation device. Here, the navigation information may include travel road information, travel lane information, destination information, route information, heading information, map information, and information on the current location of the vehicle. Meanwhile, the navigation information may include a location of the vehicle on a road.

The interface unit 430 may provide a signal to the controller 170 or the vehicle drive unit 150. Here, the signal may be a control signal.

For example, the interface unit 430 may communicate with a power source driver 151 which controls a power source. The interface unit 430 may provide a signal, generated by the processor 470, to the power source driver 151.

For example, the interface unit 430 may communicate with a brake driver 153 which controls a brake device. The interface unit 430 may provide a signal, generated by the processor 470, to the brake driver 153.

For example, the interface unit 430 may communicate with a steering driver 152 which controls a steering device. The interface unit 430 may provide a signal, generated by the processor 470, to the steering driver 152.

The memory 440 may store a variety of data required for overall operations of the driver assistance apparatus 400, such as programs for processing or controlling of the processor 470.

The memory 440 may be a variety of storage devices, such as a ROM, a RAM, an EPROM, a flash drive, a hard drive, etc. According to an embodiment, the memory 440 may be a subordinate component of the processor 470.

The memory 440 may store a priority order of a plurality of traffic signs. The priority order of the plurality of traffic signs may be stored in the memory 440 as a default value.

The memory 440 may store the priority order in which a traffic lamp signal has a priority level higher than that of a traffic signal marked on a road surface or a traffic signal marked on a traffic signboard.

The memory 440 may store the priority order in which a hand signal has a priority level higher than that of a traffic lamp signal.

The memory 440 may store the priority order in which a stop signal marked on a traffic signboard is at the highest priority level.

The memory 440 may store a priority order of a plurality of items of travel information. The priority order of the plurality of items of travel information may be stored in the memory 440 as a default value.

The memory 440 may store the priority order in which turn signal information has a priority level higher than that of destination information.

The processor 470 may be electrically connected with each unit of the driver assistance apparatus 400.

The processor 470 may control overall operations of each unit of the driver assistance apparatus 400.

The processor 470 may receive a vehicle external image photographed by the camera 200. Here, the vehicle external image may be a front field-of-view image of the vehicle.

The processor 470 may detect at least one traffic sign based on a vehicle external image.

For example, based on a vehicle external image, the processor 470 may detect at least one of a traffic signal marked on a road surface, a traffic sign marked on a traffic signboard, a traffic lamp signal, a construction zone warning signal, a traffic signal attached to another vehicle, or a hand signal.

The processor 470 may acquire a traffic sign by acquiring a drawing or text marked on a road surface based on a vehicle external image.

The processor 470 may acquire a traffic sign by detecting a drawing or text marked on a traffic signboard based on a vehicle external image.

The processor 470 may acquire a traffic sign by detecting a color or position of light output from a traffic lamp based on a vehicle external image.

The processor 470 may acquire a traffic sign by detecting at least one of a traffic corn, a temporary traffic signboard, a traffic baton, or a traffic guide light device based on a vehicle external image.

The processor 470 may acquire a traffic sign by detecting another vehicle based on a vehicle external image and detecting a traffic sign attached to a body, a bumper, or a glass of the detected vehicle.

The processor 470 may acquire a traffic sign by detecting a hand signal of a traffic police officer based on a vehicle external image. For example, the processor 470 may detect characteristics of traffic police officer cap and uniform and compare the detected characteristics with data pre-stored in the memory 440, thereby detecting a traffic police officer. When the traffic police officer is detected, the processor 470 may detect a predetermined motion of the traffic police officer and compare the detected motion with the data pre-stored in the memory 440, thereby detecting a hand signal.

The processor 470 may acquire travel information of the vehicle. The processor 470 may detect travel information of the vehicle based on a vehicle external image.

For example, the processor 470 may acquire travel road information, travel lane information, etc. based on a vehicle external image. The processor 470 may acquire the travel road information by detecting an object (e.g., a tall gate, a direction sign, and a traffic signboard) indicating entrance to a road. The processor 470 may acquire the travel lane information by detecting a lane from the vehicle external image.

The processor 470 may acquire travel information of the vehicle from the communication unit 110, the input unit 120, the sensing unit 125, the memory 130, the display device 141, the navigation device, or the controller 170 through the interface unit 430.

For example, the processor 470 may acquire travel information of the vehicle by receiving navigation information from the navigation device or the display device 141. Here, the navigation information may include travel road information, travel lane information, destination information, route information, heading information, map information, and information on the current location of the vehicle.

For example, the processor 470 may receive turn signal information from the input unit 120 or the controller 170.

For example, the processor 470 may receive steering information or heading information from the sensing unit 125 or the controller 170.

For example, the processor 470 may receive vehicle model information from the memory 130.

The processor 470 may determine whether a traffic sign fits travel information of the vehicle.

For example, the processor 470 may determine whether a traffic sign fits at least one of travel road information, travel lane information, destination information, route information, turn signal information, steering information, heading information, or vehicle model information.

When the traffic sign fits the travel information, the processor 470 may perform control to output the traffic sign through the output unit 450.

The processor 470 may perform control to display a graphic image corresponding to the traffic sign through a display unit 451.

The processor 470 may perform control to output sound corresponding to the traffic sign through a sound output unit 452.

When the traffic sign does not fit the travel information, the processor 470 may perform control not to output the traffic sign. As such, as a traffic sign fitting travel information of the vehicle is output and a traffic sign not fitting the travel information is not output, only a traffic sign fitting a travelling situation is allowed to be provided to a driver. Hence, it is possible to prevent confusion to a driver and provide only correct information.

When a traffic sign fits the travel information of the vehicle, the processor 470 may provide at least one of a steering control signal, an acceleration control signal, or a brake control signal to the vehicle drive unit 150 based on the traffic sign through the interface unit 430.

For example, the processor 470 may provide a brake control signal to the brake driver 153 based on a traffic sign indicative of speed limit information.

For example, the processor 470 may provide an acceleration control signal to the power source driver 151 based on a traffic sign indicative of uphill information.

For example, the processor 470 may provide a steering control information to the steering driver 152 based on a traffic sign indicative of curve information.

Meanwhile, a traffic sign may include at least one of a traffic signal marked on a road surface, a traffic signal marked on a traffic signboard, a traffic lamp signal, a construction zone warning signal, a traffic signal attached to another vehicle, and a hand signal.

The traffic signal marked on a road surface may be a drawing or text marked on the road surface.

The traffic signal marked on the traffic signboard may be a drawing or text marked on the traffic signboard.

The traffic lamp signal may be a color or position of light output from the traffic lamp.

The construction zone warning signal may include at least one of a traffic corn, a temporary traffic signboard, a traffic baton, or a guide light device.

The traffic signal attached to another vehicle may be a traffic sign attached to a body, a bumper, or a glass of another vehicle.

The hand signal may be a hand signal by a traffic police officer.

When a plurality of traffic signs fits travel information, the processor 470 may perform control to output a traffic sign having a higher priority level among the plurality of traffic signs according to a priority order. Here, the priority order may be a priority order of the plurality of traffic signs. Here, the plurality of traffic signs may include items of information contradictory to each other. The processor 470 may perform control not to output a traffic sign having a lower priority level.

Meanwhile, travel information of the vehicle may include at least one of travel road information, travel lane information, destination information, route information, turn signal information, steering information, heading information, or vehicle model information.

When a plurality of items of travel information is acquired, the processor 470 may determine, based on a priority order, whether a traffic sign fits an item of travel information having a higher priority level among the plurality of items of traffic information. Here, the priority order may be a priority order of a plurality of items of travel information stored in the memory 440. Here, the plurality of items of travel information may include items of information contradictory to each other.

For example, when turn signal information and destination information do not fit each other, the processor 470 may determine whether a traffic sign having a priority level higher than that of the destination information fits the turn signal information, wherein the priority level is stored in the memory 440. In this case, the processor 470 may display a traffic signal according to a driver's intention.

The processor 470 may detect a plurality of traffic signs based on a front field-of-view image of the vehicle.

The processor 470 may calculate a distance between the vehicle 100 and each of the plurality of traffic signs. The processor 470 may calculate a distance between the vehicle 100 and each of the plurality of traffic signs using an image distance detection algorithm. For example, when a stereo image is acquired, the processor 470 may calculate the distance by calculating a disparity. For example, the processor 470 may calculate the distance using a pinhole algorithm. For example, the processor 470 may calculate the distance using an actual distance and a pixel distance. For example, the processor 470 may calculate the distance using a motion vector of an object. For example, the processor may calculate the distance using a variation of size of an object per pixel.

The processor 470 may perform control to output a traffic sign closest to the vehicle 100 among a plurality of traffic signs fitting travel information.

The processor 470 may detect a first traffic sign and a second traffic sign based on a vehicle external image.

When the first traffic sign fits travel information and the second traffic sign does not fit the travel information, the processor 470 may perform control such that the first traffic sign is output through the output unit 450 whereas the second traffic sign is not output.

The processor 470 may receive state information of the vehicle based on a driving manipulation signal received through a driving manipulation device 121 through the interface unit 430. Here, the state information of the may include acceleration state information, steering state information, and brake state information.

The processor 470 may determine whether state information of the vehicle based on a driving manipulation signal fits output traffic sign information.

When the state information of the vehicle does not fit traffic sign information, the processor 470 may output an alarm through the output unit 450.

For example, in the case where output traffic sign information is speed limit information, when state information of the vehicle indicates a state in which the vehicle is accelerating beyond the speed limit, the processor 470 may output an alarm through the output unit 450.

The processor 470 may acquire rampway entering situation information. For example, the processor 470 may acquire rampway entering situation information by receiving navigation information.

For example, the processor 470 may acquire rampway entering situation information by detecting a road or a traffic signboard indicative of a rampway from a vehicle external image.

The processor 470 may perform control to output a traffic sign which fits travel information among a plurality of traffic signs placed on a plurality of paths forming a rampway.

The processor 470 may detect a plurality of traffic lamps based on a vehicle external image. The processor 470 may determine whether the plurality of traffic lamps fits travel information.

The processor 470 may perform control to output a traffic sign generated by a traffic lamp which is closest to the vehicle 100 among a plurality of traffic lamps fitting travel information.

The processor 470 may acquire lane information on a lane in which the vehicle 100 is currently traveling. For example, the processor 470 may acquire the lane information on a lane in which the vehicle 100 is currently traveling, by receiving navigation information. For example, the processor 470 may acquire the lane information on a lane in which the vehicle 100 is currently traveling, by detecting the lane from a vehicle external image.

The processor 470 may detect a plurality of traffic signs based on a front field-of-view image of the vehicle. The processor 470 may perform control to output a traffic sign which fits lane information among the plurality of traffic signs.

The plurality of traffic signs may include a first traffic sign based on a traffic signboard for a permitted left turn of the vehicle 100, and a second traffic sign based on a traffic lamp for straight running of the vehicle 100.

Based on a front field-of-view image of the vehicle, the processor 470 may detect the first traffic sign based on a traffic signboard for a permitted left turn of the vehicle 100, and the second traffic sign based on a traffic signal for straight running of the vehicle 100.

The processor 470 may acquire travel situation information indicating a situation that the vehicle 100 is traveling in a left-turn lane. For example, the processor 470 may acquire the travel situation information indicating a situation that the vehicle 100 is traveling in a left-turn lane, by receiving navigation information. For example, the processor 470 may acquire the travel situation information indicating a situation that the vehicle 10 is traveling in a left-turn lane, by detecting the lane from a vehicle external image.

The processor 470 may perform control such that the first traffic sign fitting the travel situation information is output whereas the second traffic sign not fitting the travel situation information is not output.

A plurality of traffic signs may include a first traffic sign for a right turn of the vehicle 100, and a second traffic sign based on a second traffic lamp for straight running of the vehicle 100.

Based on a front field-of-view image of the vehicle, the processor 470 may detect both the first traffic sign for a right turn of the vehicle 100, and the second traffic sign based on a second traffic lamp for straight running of the vehicle 100.

The processor may acquire travel situation information indicating a situation that the vehicle 100 is traveling in a right-turn lane. For example, the processor 470 may acquire the travel situation information indicating a situation that the vehicle 100 is traveling in a right-turn lane, by receiving navigation information. For example, the processor 470 may acquire the travel situation information indicating a situation that the vehicle 100 is traveling in a right-turn lane, by detecting the lane from a vehicle external image.

The processor 470 may perform control such that the first traffic sign fitting the travel situation information is output whereas the second traffic sign not fitting the travel situation information is not output.

The processor 470 may acquire vehicle speed information. When a speed of the vehicle 100 is equal to or lower than a reference speed, the processor 470 may perform control not to output a traffic sign even in the case where the traffic sign fits travel information.

FIG. 4B is a diagram illustrating internal configurations of a processor and a signal processing procedure by each configuration according to an embodiment of the present invention.

Referring to FIG. 4B, the processor 470 may include an image processor 471, a determiner 474, and a signal provider 477.

The image processor 471 may receive an image from the camera 200.

The image processor 471 may computer-process the received image using various techniques.

The image processor 471 may detect an object based on the received image.

The image processor 471 may detect at least one traffic sign based on the received image.

The image processor 471 may calculate a distance between the vehicle 100 and the traffic sign.

The image processor 471 may calculate the distance between the vehicle 100 and the traffic sign using an image distance detection algorithm. For example, when a stereo image is acquired, the image processor 471 may calculate the distance by calculating a disparity.

For example, the image processor 471 may calculate the distance using a pinhole model algorithm. For example, the image processor 471 may calculate the distance using an actual distance and a pixel distance. For example, the image processor 471 may calculate the distance using a motion vector of an object. For example, the image processor 471 may calculate the distance using a variation of size of an object per pixel.

Based on a received image, the image processor 471 may detect a road or a traffic signboard indicative of a rampway.

Based on a received image, the image processor 471 may detect a lane in which the vehicle 100 is currently traveling.

Based on a received image, the image processor 471 may detect a left-turn lane or a right-turn lane.

The determiner 474 may make a determination based on information received from the image processor 471, information received from the interface unit 430, or data received from the memory 440.

The determiner 474 may acquire travel information of the vehicle. For example, the determiner 474 may receive travel information of the vehicle from the image processor 471. For example, the determiner 474 acquire travel information of the vehicle from the communication unit 110, the input unit 120, the sensing unit 125, the memory 130, the display device 141, the navigation device, or the controller 170 through the interface unit 430.

The determiner 474 may determine whether a traffic sign fits travel information of the vehicle. For example, the determiner 474 may determine whether the traffic sign fits at least one of travel road information, travel lane information, destination information, route information, turn signal information, steering information, heading information, or vehicle model information.

The determiner 474 may receive information on a priority order of a plurality of traffic signs from the memory 440. Based on the information on the priority order, the determiner 474 may determine a traffic sign having a higher priority level among the plurality of traffic signs.

The determiner 474 may receive information on a priority order of a plurality of items of travel information from the memory 440. Based on the information on the priority order, the determiner 474 may determine an item of travel information having a higher priority level among the plurality of items of travel information.

Based on a determination by the determiner 474, the signal provider 477 may provide a control signal to the output unit 450. Specifically, based on a determination by the determiner 474, the signal provider 477 may provide a control signal to the output unit 450 to output a traffic sign.

The signal provider 477 may provide a control signal to the output unit 450 so as to output a traffic sign fitting the travel information of the vehicle.

The signal provider 477 may provide a control signal to the display unit 451 so as to display a graphic image corresponding to the traffic sign.

The signal provider 477 may provide a control signal to the sound output unit 452 so as to output sound corresponding to the traffic sign.

When the traffic sign fits the travel information of the vehicle, the signal provider 477 may provide a control signal to the controller 170 or the vehicle drive unit 150 based on the traffic sign through the interface unit 430. Specifically, the signal provider 477 may provide at least one of a brake control signal, an acceleration control signal, or a steering control signal.

Referring back to FIG. 4A, the output unit 450 may output data or information, processed by the processor 470, in accordance with control by the processor 470.

The output unit 450 may include the display unit 451 and the sound output unit 452.

The display unit 451 may display information processed by the processor 470. The display unit 451 may display an image relating to an operation of the driver assistance apparatus 400. In order to display such an image, the display unit 451 may include a cluster or a Head Up Display (HUD) disposed at the front in the interior of the vehicle. Meanwhile, when the display unit 451 is the HUD, the display unit 451 may include a projection module which projects an image onto the front windshield 10 or a combiner of the vehicle 100.

The sound output unit 452 may output sound to an outside based on an audio signal processed by the processor 470. To this end, the sound output unit 452 may include at least one speaker.

The communication unit 410 may exchange data with a different device located inside or outside the vehicle in a wireless method. Here, the different device may include a mobile terminal, a server, or another vehicle.

For example, the communication unit 410 may wirelessly exchange data with a mobile terminal of a driver of the vehicle.

As a method for the wireless data communication, a variety of methods are allowed, such as Bluetooth, WiFi Direct, WiFi, APiX, and NFC.

For example, the communication unit 410 may receive weather information and road traffic information such as Transport Protocol Expert Group (TPEG) information from a mobile terminal or a server.

Meanwhile, when a user is onboard the vehicle, the user's mobile terminal and the driver assistance apparatus 200 may be paired automatically or according to execution of an application by the user.

The communication unit 410 may receive traffic lamp change information from an external server. Here, the external server may be a server located in a traffic control.

The input unit 420 may receive a user input. The input unit 420 may include a mechanical input device, a touch input device, a voice input device, or a wireless input device.

The mechanical input device may include a button, a lever, a job wheel, a switch, etc.

The touch input device may include at least one touch sensor.

The touch input device may be implemented as a touch screen.

The voice input device may include a microphone which converts a user's voice into an electrical signal.

The wireless input device may receive a wireless user input which is input using a key from the outside of the vehicle 100.

The input unit 420 may receive a user input for opening or closing a door included in the vehicle 100.

The power supply 490 may supply power required to operate each component under the control of the processor 470. The power supply 490 may be supplied with power from a battery or the like provided in the vehicle.

FIGS. 5A and 5B illustrate various examples of an internal block diagram of the image processor illustrated in FIG. 4B, and FIGS. 5C and 5D are diagrams illustrating operation of the processor illustrated in FIG. 5B.

Referring to FIG. 5A, FIG. 5A is an example of an internal block diagram of the image processor 471, and the image processor 471 may include an image preprocessor 501, a disparity calculator 502, an object detector 504, an object tracking unit 506, and an application unit 507.

The image preprocessor 501 may receive an image from the camera 200 and perform preprocessing with respect to the received image.

Specifically, the image preprocessor 501 may perform noise reduction, rectification, calibration, color enhancement, color space conversion (CSC), interpolation, camera gain control, etc. with respect to an image. Accordingly, an image more vivid than a stereo image acquired by the camera 200 may be acquired.

The disparity calculator 502 may receive images signal-processed by the image preprocessor 501, perform stereo matching with respect to the received images, and acquire a disparity map according to the stereo matching. That is, disparity information on a stereo image may be acquired.

Here, the stereo matching may be performed on a pixel unit or a predetermined block unit of stereo images. Meanwhile, the disparity map may refer to a map that numerically indicates binocular parallax information of a stereo image, that is, left and right images.

A segmentation unit 503 may perform segmentation or clustering on at least one of images based on disparity information received from the disparity calculator 502.

Specifically, the segmentation unit 503 may divide at least one of stereo images into a background and a foreground based on the disparity information.

For example, a region with disparity information equal to or less than a predetermined level in the disparity map may be calculated as the background, and the corresponding region may be excluded. As such, the relative foreground may be separated.

In another example, a region with disparity information equal to or greater than the predetermined level in the disparity map may be calculated as the foreground, and the corresponding region may be extracted. As such, the foreground may be separated.

As such, the foreground and the background may be separated based on disparity information extracted based on a stereo image, and thus, signal processing speed, signal processing amount, and so on may be reduced during subsequent object detection.

Then, the object detector 504 may detect an object based on image segmentation by the segmentation unit 503.

That is, the object detector 504 may detect an object in at least one of images based on the disparity information.

Specifically, the object detector 504 may detect an object in at least one of images. For example, an object may be detected from a foreground extracted via image segmentation.

Then, an object verification unit 505 may classify and verify a separated object.

To this end, the object verification unit 505 may employ an identification scheme using a neural network, a support vector machine (SVM) scheme, an identification scheme via AdaBoost using Haar-like features, a histograms of oriented gradients (HOG) scheme, or the like.

Meanwhile, the object verification unit 505 may compare objects stored in the memory 440 with the detected object to verify the detected object.

For example, the object verification unit 505 may verify a surrounding vehicle, a lane, a road surface, a signboard, a dangerous area, a tunnel, or the like, positioned around a vehicle.

The object tracking unit 506 may track the verified object. For example, the object tracking unit 506 may verify an object in sequentially acquired images, calculate motion of the verified object or a motion vector, and track movement of the corresponding object based on the calculated motion or motion vector.

Accordingly, a surrounding vehicle, a lane, a road surface, a signboard, a dangerous area, a tunnel, or the like, positioned around a vehicle, may be tracked.

Then, the application unit 507 may calculate a risk level of the vehicle 100 based on various objects located around the vehicle, e.g., another vehicle, a lane, a road surface, a signboard, etc. In addition, a possibility of crash with a vehicle ahead, occurrence of slipping of the vehicle, etc. may be calculated.

In addition, as driver assistant information, the application unit 507 may output a message or the like for informing a user of the calculated risk level, the possibility of crash, or occurrence of slipping. Alternatively, a control signal for controlling a position or travelling of the vehicle 100 may be generated as vehicle control information.

Meanwhile, according to an embodiment, the processor 470 may include only some of the image processor 501, the disparity calculator 502, the segmentation unit 503, the object detector 504, the object verification unit 505, the object tracking unit 506, and the application unit 507. For example, when the camera 200 is implemented as a mono camera, the disparity calculator 502 may be excluded. In addition, according to an embodiment, the segmentation unit 503 may be excluded.

FIG. 5B is another example of an internal block diagram of a processor.

Referring to the drawing, a processor 470 of FIG. 5B has the same internal constituent units as the processor 470 of FIG. 4A but is different in terms of a signal processing order. Hereinafter, embodiments of the present invention will be described in terms of such difference.

An object detector 504 may receive stereo images, and detect an object from at least one of the stereo images. Unlike FIG. 5A, the object may be detected directly from a stereo image, rather than an image which is segmented based on disparity information.

Then, an object verification unit 505 may classify and verify an object based on an image segment received from a segmentation unit 503 and an object detected by the object detector 504.

To this end, the object verification unit 505 may employ an identification scheme using a neural network, a support vector machine (SVM) scheme, an identification scheme via AdaBoost using Haar-like features, a histograms of oriented gradients (HOG) scheme, or the like.

FIGS. 5C and 5D are diagrams illustrating an operating method of the processor 470, illustrated in FIGS. 5A and 5B, based on stereo images respectively acquired in first and second frame sections.

Referring to FIG. 5, the stereo camera 200b acquires a stereo image during the first frame section.

The disparity calculator 502 in the processor 470 receives stereo images FR1 a and FR1 b signal-processed by the image preprocessor 501, and performs stereo matching on the received stereo images FR1 a and FR1 b to acquire a disparity map 520.

The disparity map 520 may be obtained by leveling binocular parallax between the stereo images FR1a and FR1b, and calculation may be performed in such a way that a distance from a vehicle is calculated to be close, as a disparity level is increased, and the distance from the vehicle is calculated to be far as a disparity level is reduced.

Meanwhile, when the disparity map is displayed, brightness may be high as a disparity level is increased and, brightness may be low as a disparity level is reduced.

The drawing shows an example in which first to fourth lanes 528a, 528b, 528c, and 528d, and the like have respective disparity levels corresponding thereto and a construction zone 522, a first preceding vehicle 524, and a second preceding vehicle 526 have respective disparity levels corresponding thereto in the disparity map 520.

The segmentation unit 503, the object detector 504, and the object verification unit 505 may perform segmentation, object detection, and object verification, respectively, on at least one of the stereo images FR1a and FR1b based on the disparity map 520.

The drawing shows an example in which objection detection and verification are performed on the second stereo image FR1b using the disparity map 520.

That is, an object, for example, first to fourth lanes 538a, 538b, 538c, and 538d, a construction zone 532, a first preceding vehicle 534, and a second preceding vehicle 536 may be detected and verified in an image 530.

Then, referring to FIG. 5D, the stereo camera 200b acquires a stereo image during the second frame section.

The disparity calculator 502 in the processor 470 receives stereo images FR2a and FR2b signal-processed by the image preprocessor 501, and performs stereo matching on the received stereo images FR2a and FR2b to acquire a disparity map 540.

The drawing shows an example in which first to fourth lanes 548a, 548b, 548c, and 548d, and the like have respective disparity levels corresponding thereto and a construction zone 542, a first preceding vehicle 544, and a second preceding vehicle 546 have respective disparity levels corresponding thereto in the disparity map 540.

The segmentation unit 503, the object detector 504, and the object verification unit 505 may perform segmentation, object detection, and object verification, respectively, on at least one of the stereo images FR2a and FR2b based on the disparity map 540.

The drawing shows an example in which objection detection and verification are performed on the second stereo image FR2b using the disparity map 540.

That is, an object, for example, first to fourth lanes 558a, 558b, 558c, and 558d, a construction zone 552, a first preceding vehicle 554, and a second preceding vehicle 556 may be detected and verified in an image 550.

Meanwhile, the object tracking unit 506 may track a verified object by comparing FIGS. 5A and 5B.

Specifically, the object tracking unit 506 may track movement of each object verified in FIGS. 5A and 5B based on motion of a corresponding object or a motion vector thereof. Accordingly, a lane, a construction zone, a first preceding vehicle, a second preceding vehicle, or the like, positioned around a vehicle, may be tracked.

FIGS. 5E and 5F are diagrams illustrating an operating method of the driver assistance apparatus illustrated in FIGS. 5A to 5D.

First, FIG. 5E is a diagram showing an example of a situation in front of the photographed by the stereo camera 200b included in the vehicle. In particular, the vehicle front situation may be displayed as a bird's eye view.

As seen from the drawing, a first lane 642a, a second lane 644a, a third lane 646a, and a fourth lane 648a may be viewed to the right from the left, a construction zone 610a may be positioned between the first lane 642a and the second lane 644a, a first preceding vehicle 620 a may be positioned between the second lane 644a and the third lane 646a, and a second preceding vehicle 630a may be positioned between the third lane 646a and the fourth lane 648a.

Then, FIG. 5F shows an example in which a situation in front of the vehicle recognized by the driver assistance apparatus is displayed along with various information items. In particular, an image shown in FIG. 5D may be displayed on a display device 600 for the vehicle.

Unlike FIG. 5E, FIG. 5F shows an example in which information is displayed based on an image photographed by the stereo camera 200.

As seen from the drawing, a first lane 642b, a second lane 644b, a third lane 646b, and a fourth lane 648b may be viewed to the right from the left, a construction zone 610b may be positioned between the first lane 642b and the second lane 644b, a first preceding vehicle 620b may be positioned between the second lane 644b and the third lane 646b, and a second preceding vehicle 630b may be positioned between the third lane 646b and the fourth lane 648b.

The camera 200 may perform signal processing on stereo images photographed by the stereo cameras 200b to verify objects corresponding to the construction zone 610b, the first preceding vehicle 620b, and the second preceding vehicle 630b. In addition, the first lane 642b, the second lane 644b, the third lane 646b, and the fourth 648b may be verified.

Meanwhile, the drawing illustrates an example in which edges are highlighted to indicate object verification of the construction zone 610b, the first preceding vehicle 620b, and the second preceding vehicle 630b.

Meanwhile, the camera 200 may calculate distance information on the construction zone 610b, the first preceding vehicle 620b, and the second preceding vehicle 630b based on the stereo images photographed by the stereo camera 200b.

The drawing illustrates an example in which first distance information 611b, second distance information 621b, and third distance information 631b, which are calculated to correspond to the construction zone 610b, the first preceding vehicle 620b, and the second preceding vehicle 630b, respectively, are displayed.

The camera 200 may receive sensor information of the vehicle from the controller 170 or the internal sensing unit 125. In particular, the camera 200 may receive vehicle speed information, gear information, yaw rate information indicating speed at which a rotation angle (yaw angle) of the vehicle is changed, and angle information of the vehicle may be received, and these information items may be displayed.

The drawing illustrates an example in which vehicle speed information 672, gear information 671, and yaw rate information 673 are displayed on an upper portion 670 of a front field-of-view image of the vehicle and vehicle angle information 682 is displayed on a lower portion 680 of the front field-of-view image of the vehicle or, alternatively, there may be various examples. In addition, vehicle width information 683 and road curvature information 681 may be displayed along with the vehicle angle information 682.

FIG. 6 is a flowchart illustrating operation of a driver assistance apparatus according to an embodiment of the present invention.

Referring to FIG. 6, the processor 470 may acquire a vehicle external image (S610). The processor 470 may acquire a front field-of-view image of the vehicle photographed by the camera 200. The processor 470 may detect at least one traffic sign based on the front field-of-view image of the vehicle (S620).

Here, the traffic sign may include at least one of a traffic signal marked on a road surface, a traffic signal marked on a traffic signboard, a traffic lamp signal, a construction zone warning signal, a traffic signal attached to another vehicle, or a hand signal.

The processor 470 may acquire travel information of the vehicle (S630).

Here, the travel information of the vehicle may include at least one of travel road information, travel lane information, destination information, route information, turn signal information, steering information, heading information, or vehicle model information.

The processor 470 may determine whether the traffic sign fits the travel information (S640).

When the traffic sign fits the travel information, the processor 470 may perform control to output the detected traffic sign (S650).

Meanwhile, when a plurality of traffic signs is detected, the processor 470 may perform control to output a traffic sign having a higher priority level among the plurality of traffic signs according to a priority order which is stored in the memory 440 with respect to the plurality of traffic signs.

Meanwhile, when a plurality of items of travel information is acquired, the processor 470 may perform control to output a traffic sign fitting an item of travel information having a higher priority level among the plurality of items of travel information according to a priority order which is stored in the memory 440 with respect to the plurality of travel information.

When the traffic sign does not fit the travel information, the processor 470 may perform control not to output the detected traffic sign (S660).

FIG. 7 is a diagram illustrating an operation of detecting a traffic sign according to an embodiment of the present invention. Referring to FIG. 7, the processor 470 may receive an image photographed by the camera 200. Reference numeral 700 indicates an example of an image corresponding to a predetermined frame in the image photographed by the camera 200.

Based on the received image, the processor 470 may detect and acquire traffic signs 711, 712, 713, 714, 715, and 716.

On a road surface, traffic signs may be marked, such as various road surface markings (e.g., a center lane, a U-turn line, a bus lane, and a lane change not-allowed line) or direction arrows (e.g., a left turn, straight running, a right turn, and a U-turn).

The processor 470 may detect the traffic sign 712 marked on a road surface from the received image.

A traffic sign, such as a caution sign, a regulatory sign, an instruction sign, or an auxiliary sign, may be marked on the traffic signboard.

The processor 470 may detect the traffic sign 711 marked on a traffic signboard from the received image.

The processor 470 may acquire the traffic sign 713 by detecting a color or position of light output from a traffic lamp based on a vehicle external image.

The processor 470 may acquire the traffic sign 715 by detecting at least one of a traffic corn, a temporary traffic signboard, a traffic baton, or a guide light device based on a vehicle external image.

The processor 470 may acquire the traffic sign 716 by detecting another vehicle based on a vehicle external image and detecting a traffic sign attached to a body, a bumper, or a glass of another vehicle.

The processor 470 may acquire the traffic sign 714 by detecting a hand signal by a traffic police officer based on a vehicle external image. For example, the processor 470 may detect characteristics of traffic police officer cap and uniform and compare the detected characteristics with data pre-stored in the memory 440, thereby detecting a traffic police officer. When the traffic police officer is detected, the processor 470 may detect a predetermined motion of the traffic police officer and compare the detected motion with data pre-stored in the memory 440, thereby detecting a hand signal.

FIG. 8 is a diagram illustrating an operation of a driver assistance apparatus in response to detection of a plurality of traffic signs according to an embodiment of the present invention.

Referring to FIG. 8, the processor 470 may detect a plurality of traffic signs 811, 812, and 813 from a received image.

The memory 440 may store a priority order of the plurality of traffic signs.

When the plurality of detected traffic signs fits travel information, the processor 470 may perform control to output a traffic sign having a higher priority level among the plurality of traffic signs according to the priority order stored in the memory 440. Here, the plurality of traffic signs may include items of information contradictory to each other.

For example, the processor 470 may detect the traffic sign 812 based on a traffic lamp signal, and the traffic sign 813 based on a traffic signboard. In this case, the processor 470 may perform control to output the traffic sign 812 based on the traffic lamp according to the priority order stored in the memory 440. In this case, the processor 470 may perform control not to output the traffic sign 813 based on the traffic signboard.

For example, the processor 470 may detect both the traffic sign 812 based on a traffic lamp, and the traffic signboard 811 on which a stop signal is marked. In this case, the processor 470 may perform control to output the stop signal marked on the traffic signboard 811 according to the priority order stored in the memory 440.

For example, the processor 470 may detect a hand signal 814 as well as the traffic sign 812 based on a traffic lamp. In this case, the processor 470 may perform control to output the hand signal 814 according to the priority order stored in the memory 440.

FIG. 9 is a diagram illustrating an operation of outputting a traffic sign according to an embodiment of the present invention.

Referring to FIG. 9, the processor 470 may control the display unit 451 to display traffic signs 931 and 932. Specifically, the processor 470 may control the display unit 451 to display graphic images 931 and 932 corresponding to traffic signs.

For example, the processor 470 may control the display unit 451 to display a text 931 corresponding to a detected traffic sign.

For example, the processor 470 may control the display unit 451 to display an image 932 corresponding to a detected traffic sign. Here, the image 932 may be an image of a traffic sign region in an image received by the processor 470 from the camera 200.

Meanwhile, the processor 470 may output a traffic sign through the sound output unit 452.

For example, the processor 470 may output a voice of content corresponding to a traffic sign.

FIG. 10 is a diagram illustrating a driver assistance apparatus in response to acquisition of a plurality of items of travel information according to an embodiment of the present invention.

Referring to FIG. 10, the processor 470 may receive a plurality of items of travel information. The plurality of items of travel information may be items of information contradictory to each other.

As illustrated in FIG. 10, before entering an intersection, the processor 470 may receive destination information and right-turn signal information. The destination information indicates a straight forward direction at the intersection. While the vehicle 100 is traveling in the rightmost lane, a right-turn signal input may be received.

Meanwhile, the processor 470 may detect a traffic sign of a first traffic lamp 1011 indicative of straight running, and a traffic sign of a second traffic lamp 1012 indicative of a right turn.

Meanwhile, turn signal information may be stored in the memory 440 with a priority level higher than that of the destination information.

The processor 470 may determine whether the first traffic lamp 1011 and the second traffic lamp 1012 fit the turn signal information. The first traffic lamp 1011 is a traffic lamp for straight running and thus does not fit the turn signal information. The second traffic lamp 1012 is a traffic lamp for a right turn and thus fits the turn signal information.

The processor 470 may control the output unit 450 so as to output the traffic sign of the second traffic lamp 1012 fitting the turn signal information.

By performing control in the above manner, the driver assistance apparatus 400 may output a traffic sign fitting a driver's intention and my not output a traffic sign not fitting the driver's intention.

FIG. 11 is a diagram illustrating an operation of outputting a traffic sign based on distance to a plurality of traffic signs according to an embodiment of the present invention.

Referring to FIG. 11, the processor 470 may detect a plurality of traffic signs 1111 and 1112 based on a received image. Information items included in each of the plurality of traffic signs may be contradictory to each other.

The processor 470 may calculate a distance between the vehicle 100 and each of the plurality of traffic signs 1111 and 1112.

When the plurality of detected traffic signs fits travel information of the vehicle, the processor 470 may control the output unit 450 to output the traffic sign 1111 closest to the vehicle 100 among the plurality of traffic signs.

Information indicating that the traffic sign 1111 closest to the vehicle 100 needs to apply to the vehicle at a time of traveling is included. In this case, there is an advantage in that information most appropriate for the vehicle 100 is provided to a driver.

FIG. 12 is a diagram illustrating an operation of outputting a traffic sign in response to detection of a plurality of traffic signs according to an embodiment of the present invention.

Referring to FIG. 12, the processor 470 may detect both a first traffic sign 1211 and a second traffic sign 1212 from a received image.

The first traffic sign may be a traffic sign based on a traffic lamp for straight running. The second traffic sign may be a traffic signboard indicative of a permitted left-turn.

The processor 470 may receive route information of the vehicle 100. When the vehicle 100 needs to travel straight ahead according to the route information, the processor 470 may control the output unit 450 to output the first traffic sign. In addition, the processor 470 may perform control not to output the second traffic sign which does not fit the route information.

FIG. 13 is a diagram illustrating an operation of outputting an alarm by a driver assistance apparatus according to an embodiment of the present invention.

Referring to FIG. 13, the processor 470 may receive state information of the vehicle based on a driving manipulation signal through the interface unit 430.

The processor 470 may determine whether the state information fits output traffic sign information.

If the state information does not fit the output traffic sign information, the processor 470 may output an alarm through the output unit 450.

As illustrated in FIG. 13, the processor 470 may detect a speed limit traffic sign marked on a traffic signboard from a received image. When the traffic sign fits travel information of the vehicle, the processor 470 may perform control to output the traffic sign.

Then, the processor 470 may receive vehicle speed information based on a driving manipulation signal. If a speed of the vehicle exceeds speed limit corresponding to the traffic sign, the processor 470 may output an alarm through the output unit 450.

FIG. 14 is a diagram illustrating an operation of a driver assistance apparatus in response to entrance to a rampway according to an embodiment of the present invention.

Referring to FIG. 14, the processor 470 may acquire rampway entering situation information.

The processor 470 may acquire rampway entering situation information by receiving navigation information. In another example, the processor 470 may acquire rampway entering situation information based on a road shape detected from a vehicle external image. In yet another example, the processor 470 may acquire rampway entering situation information by detecting a traffic signboard indicative of a rampway.

The processor 470 may perform control to output a traffic sign which fits travel information among a plurality of traffic signs placed on a plurality of paths forming the rampway.

As illustrated in FIG. 14, the processor 470 may detect a first traffic sign 1411, a second traffic sign 1412, and a third traffic sign 1413.

The first traffic sign 1411 corresponds to a first path among paths forming the rampway. That is, the first sign 1411 is a signal provided to a vehicle traveling on the first path.

The second traffic sign 1412 and the third traffic sign 1413 correspond to a second path among the paths forming the rampway. That is, the second traffic sign 1412 and the third traffic sign 1413 are signals provided to a vehicle which is traveling on the second path.

The processor 470 may receive travel information of the vehicle. The travel information of the vehicle may include at least one of travel road information, travel lane information, destination information, route information, turn signal information, steering information, heading information, or vehicle model information.

The processor 470 may select one of the first path and the second path based on the travel information of the vehicle. For example, the processor 470 may select one of the first path and the second path based on at least one of travel lane travel information, destination information, route information, turn signal information, steering information, or heading information.

If the first path is selected, the processor 470 may control the output unit 450 to output the first traffic sign 1411 corresponding to the first path.

FIG. 15 is a diagram illustrating an operation of a driver assistance apparatus in response to detection of a plurality of traffic lamps according to an embodiment of the present invention.

Referring to FIG. 15, the processor 470 may detect a first traffic lamp 1511 and a second traffic lamp 1512 based on a received image.

The processor 470 may calculate a distance between the vehicle 100 and the first traffic lamp 1511. The processor 470 may calculate a distance between the vehicle 100 and the second traffic lamp 1512. As illustrated in FIG. 15, the first traffic lamp 1511 may be closer to the vehicle 100 than the second traffic lamp 1512 is.

The processor 470 may determine whether the first traffic lamp 1511 and the second traffic lamp 1512 fit travel information of the vehicle.

If the first traffic lamp 1511 and the second traffic lamp 1512 fit the travel information of the vehicle, the processor 470 may perform control to output a traffic sign corresponding to the first traffic lamp 1511.

In the case where a traffic sign of the first traffic lamp 1511 indicates Go and a traffic sign of the second traffic lamp 1512 indicates Stop, when both the traffic sign of the first traffic lamp 1511 and the traffic sign of the second traffic sign 1512 are output, a driver may feel confused. In this case, only the traffic sign of the first traffic lamp 1511 closer to the vehicle 10 may be output, preventing the confusion to the driver.

FIG. 16 is a diagram illustrating an operation of outputting a traffic sign fitting line information by a driver assistance apparatus according to an embodiment of the present invention.

Referring to FIG. 16, the vehicle 100 may travel in a lane among a plurality of lanes 1621, 1622, and 1623 on a road. In proximity to an intersection, the plurality of lines may be defined as a left-turn lane 1621, a straight running lane 1622, a right-turn lane 1623, respectively.

The processor 470 may acquire lane information on a lane in which the vehicle 100 is traveling among the plurality of lanes 1621, 1622, and 1623. For example, the processor 470 may acquire the lane information on a lane in which the vehicle 100 is traveling, by receiving navigation information. For example, the processor 470 may acquire the lane information on a lane in which the vehicle 100 is traveling, by detecting the lane from a received image.

Meanwhile, the processor 470 may detect a plurality of traffic signs 1611, 1612, and 1613 based on a front field-of-view image of the vehicle.

The processor 470 may perform control to output a traffic sign fitting to lane information among the plurality of traffic signs 1611, 1612, and 1613.

For example, a plurality of traffic sigs may include a first traffic sign 1611 based on a traffic signboard for a permitted left turn of the vehicle 100, and a second traffic sign 1612 based on a traffic lamp for straight running of the vehicle 100.

If the vehicle 100 is traveling in the left-turn lane 1621, the processor 470 may acquire situation information indicating a situation that the vehicle 100 is traveling in the left-turn lane 1621.

The processor 470 may determine whether the first traffic sign 1611 and the second traffic sign 1612 fit the situation information indicating a situation that the vehicle 100 is traveling in the left-turn lane 1621. In this embodiment, the first traffic sign 1611 fits the situation information, and the second traffic sign 1612 does not fit the situation information.

The processor 470 may perform control such that the first traffic is output and the second traffic is not output.

In another example, a plurality of traffic signs may include a first traffic sign 1613 based on a first traffic lamp for a right turn of the vehicle 100, and a second traffic sign 1612 based on a second traffic lamp for straight running of the vehicle 100.

If the vehicle 100 is traveling in the right-turn lane 1623, the processor 470 may acquire situation information indicating a situation that the vehicle 100 is traveling in the right-turn lane 1623.

The processor 470 may determine whether the first traffic sign 1613 and the second traffic sign 1612 fit the situation information indicating a situation that the vehicle 100 is traveling in the right-turn lane. In this situation, the first traffic sign 1613 fits the situation information, and the second traffic sign 1612 does not fit the situation information.

The processor 470 may perform control such that the first traffic sign is output and the second traffic sign is not output.

FIG. 17 is a diagram illustrating an operation of a driver assistance apparatus in a congested area according to an embodiment of the present invention.

Referring to FIG. 17, the processor 470 may acquire vehicle speed information. When a speed of the vehicle is equal to or lower than a reference speed, the processor 470 may perform control not to output a traffic sign 1710 even in the case where the traffic sign 1710 fits travel information.

In this case, the traffic sign 1710 may be far from the vehicle 100 at a reference distance or more.

When a speed of the vehicle is equal to or lower than the reference speed due to traffics, the traffic sign 1710 at the reference distance or more from the vehicle 100 is not appropriate for the congestion situation. In this case, the traffic sign 1710 not appropriate for the congestion situation, thereby preventing confusion to a driver.

FIG. 18 is a diagram illustrating an operation of a driver assistance apparatus depending on a vehicle model according to an embodiment of the present invention.

Referring to FIG. 18, a traffic sign necessary to provide may differ depending a type of the vehicle 100 even in the case of traveling on the same road.

For example, in the case of traveling on a highway, speed limit may differ depending on whether a vehicle travelling on the highway is a passenger vehicle or a truck.

As illustrated in FIG. 18, speed limit for passenger vehicles may be 100 km/h, and speed limit for trucks may be 60 km/h. In this case, a first traffic signboard 1811 for passenger vehicles and a second traffic signboard 1812 for trucks may be arranged together on the highway.

The processor 470 may detect a first traffic sign based on the first traffic signboard 1811, and a second traffic sign based on the second traffic signboard 1812.

The processor 470 may determine whether the first traffic sign and the second traffic sign fits vehicle model information which is included in travel information of the vehicle. The vehicle model information may be stored in the memory 130 of the vehicle 100.

If the vehicle 100 is a passenger vehicle, the first traffic sign fits the vehicle model information and the second traffic sign does not fit the vehicle model information.

The processor 470 may perform control such that the first traffic sign fitting the vehicle model information is output and the second traffic sign not fitting the vehicle model information is not output.

The above-described methods can be implemented in a program recorded medium as computer-readable codes. The computer-readable media may include all kinds of recording devices in which data readable by a computer system are stored. The computer-readable media may include Hard Disk Drive (HDD), Solid State Disk (SSD), Silicon Disk Drive (SDD), ROM, RAM, CD-ROM, magnetic tapes, floppy discs, optical data storage devices, and the like, and also include carrier-wave type implementations (e.g., transmission via Internet). Further, the computer may include a processor or a controller. Accordingly, the above-mentioned detailed description should be considered only for illustrative purposes, not for restrictive purposes. The scope of the present invention should be determined by rational interpretation of the claims, and all modifications within equivalent ranges of the present invention should be construed as being included in the scope of the present invention.

What is claimed is:

1. A driver assistance apparatus for a vehicle, comprising:
a camera configured to acquire a front field-of-view image of the vehicle;
an output unit; and
a processor configured to detect at least one traffic sign based on the front field-of-view image of the vehicle, determine whether the traffic sign fits travel information of the vehicle, and, when the traffic sign fits the travel information, perform control to output the traffic sign through the output unit,
wherein the processor is further configured to:
acquire vehicle speed information, and
when a speed of the vehicle is equal to or lower than a reference speed, perform control not to output the traffic sign even in a case where the traffic sign fits the travel information.

2. The driver assistance apparatus of claim 1, wherein the processor is further configured to, when the traffic sign does not fit the travel information, perform control not to output the traffic sign.

3. The driver assistance apparatus of claim 1, further comprising an interface unit,
wherein the processor is further configured to, when the traffic sign fits the travel information, provide at least one of a steering control signal, an acceleration control signal, or a brake control signal through the interface unit based on the traffic sign.

4. The driver assistance apparatus of claim 1, wherein the traffic sign comprises at least one of a traffic signal marked on a road surface, a traffic signal marked on a traffic signboard, a traffic lamp signal, a construction zone warning signal, a traffic signal attached to another vehicle, or a hand signal.

5. The driver assistance apparatus of claim 4, further comprising a memory configured to store a priority order of a plurality of traffic signs,
wherein the processor is further configured to, when the plurality of traffic signs fits the travel information, perform control based on the priority order to output a traffic sign having a higher priority level among the plurality of traffic signs.

6. The driver assistance apparatus of claim 5, wherein the memory is further configured to store the priority order in which the traffic lamp signal has a priority level higher than a priority level of the traffic signal marked on the road surface or the traffic signal marked on the traffic signboard.

7. The driver assistance apparatus of claim 5, wherein the memory is further configured to store the priority order in which the hand signal has a priority level higher than a priority level of the traffic lamp signal.

8. The driver assistance apparatus of claim 5, wherein the memory is further configured to store the priority order in which a stop signal marked on the traffic signboard has a highest priority level.

9. The driver assistance apparatus of claim 1, wherein the travel information comprises at least one of travel road information, travel lane information, destination information, route information, turn signal information, steering information, heading information, or vehicle model information.

10. The driver assistance apparatus of claim 9, further comprising: a memory configured to store a priority order of a plurality of items of travel information,
wherein the processor is further configured to, when the plurality of items of travel information, determine whether the traffic sign fits an item of travel information having a higher priority level among the plurality of items of travel information, based on the priority order.

11. The driver assistance apparatus of claim 10,
wherein the memory is further configured to store the priority order in which the turn signal information has a priority level higher than a priority level of the destination information, and
wherein the processor is further configured to, when the turn signal information and the destination information do not fit each other, determine whether the traffic sign fits the turn signal information.

12. The driver assistance apparatus of claim 1, wherein the processor is further configured to:
detect a plurality of traffic signs based on the front field-of-view image of the vehicle;
calculate a distance between a vehicle and each of the plurality of traffic signs; and
perform control to output a traffic sign closest to the vehicle among the plurality of traffic signs which fits the travel information.

13. The driver assistance apparatus of claim 1, wherein the processor is further configured to:

detect a first traffic sign and a second traffic sign based on the front field-of-view image of the vehicle; and when the first traffic sign fits the travel information and the second traffic sign does not fit the travel information, perform control to output the first traffic sign through the output unit and not to output the second traffic sign.

14. The driver assistance apparatus of claim 1, further comprising an interface unit, wherein the processor is further configured to, when state information of the vehicle received based on a driving manipulation signal through the interface unit does not fit output traffic sign information, output an alarm through the output unit.

15. The driver assistance apparatus of claim 1, wherein the processor is further configured to:

acquire rampway entering situation information related to a rampway; and perform control to output a traffic sign which fits the travel information among a plurality of traffic signs placed on a plurality of paths forming the rampway.

16. The driver assistance apparatus of claim 1, wherein the processor is further configured to:

detect a plurality of traffic lamps based on the front field-of-view image of the vehicle; and perform control to output a traffic sign generated by a traffic lamp closest to the vehicle among a plurality of traffic lamps fitting the travel information.

17. The driver assistance apparatus of claim 1, wherein the processor is further configured to:

acquire lane information on a lane in which a vehicle is travelling;

detect a plurality of traffic signs based on the front field-of-view image of the vehicle; and perform control to output a traffic sign which fits the lane information among the plurality of traffic signs.

18. A driver assistance apparatus for a vehicle, comprising:

a camera configured to acquire a front field-of-view image of the vehicle;

an output unit; and a processor configured to detect at least one traffic sign based on the front field-of-view image of the vehicle, determine whether the traffic sign fits travel information of the vehicle, and, when the traffic sign fits the travel information, perform control to output the traffic sign through the output unit, wherein the processor is further configured to:

acquire lane information on a lane in which a vehicle is travelling, detect a plurality of traffic signs based on the front field-of-view image of the vehicle, and perform control to output a traffic sign which fits the lane information among the plurality of traffic signs, wherein the plurality of traffic signs comprises a first traffic sign based on a traffic signboard for a permitted left turn of the vehicle, and a second traffic sign based on a traffic lamp for straight running of the vehicle, and wherein the processor is further configured to:

acquire situation information indicating a situation that the vehicle is travelling on a left-turn lane, and perform control to output the first traffic sign and not to output the second traffic sign.

19. A driver assistance apparatus for a vehicle, comprising:

a camera configured to acquire a front field-of-view image of the vehicle;

an output unit; and a processor configured to detect at least one traffic sign based on the front field-of-view image of the vehicle, determine whether the traffic sign fits travel information of the vehicle, and, when the traffic sign fits the travel information, perform control to output the traffic sign through the output unit, wherein the processor is further configured to:

acquire lane information on a lane in which a vehicle is travelling, detect a plurality of traffic signs based on the front field-of-view image of the vehicle, and perform control to output a traffic sign which fits the lane information among the plurality of traffic signs, wherein the plurality of traffic signs comprises a first traffic sign based on a first traffic lamp for a right turn of the vehicle, and a second traffic sign based on a second signal lamp for straight running of the vehicle, and wherein the processor is further configured to:

acquire situation information indicating a situation that the vehicle is travelling in a right-turn lane, and perform control to output the first traffic sign and not to output the second traffic sign.

* * * * *